US007874908B2

(12) United States Patent
Walker et al.

(10) Patent No.: US 7,874,908 B2
(45) Date of Patent: Jan. 25, 2011

(54) METHOD AND APPARATUS FOR PAYOUTS DETERMINED BASED ON A SET COMPLETION GAME

(75) Inventors: Jay S. Walker, Ridgefield, CT (US); James A. Jorasch, Stamford, CT (US); Geoffrey M. Gelman, Stamford, CT (US); Stephen C. Tulley, Fairfield, CT (US); Daniel E. Tedesco, Huntington, CT (US); Steven M. Santisi, Ridgefield, CT (US)

(73) Assignee: IGT, Reno, NV (US)

( * ) Notice: Subject to any disclaimer, the term of this patent is extended or adjusted under 35 U.S.C. 154(b) by 1630 days.

(21) Appl. No.: 10/793,140

(22) Filed: Mar. 3, 2004

(65) Prior Publication Data

US 2004/0204229 A1 Oct. 14, 2004

Related U.S. Application Data

(60) Provisional application No. 60/451,620, filed on Mar. 3, 2003.

(51) Int. Cl.

*A63F 9/24* (2006.01)
*A63F 13/00* (2006.01)
*G06F 17/00* (2006.01)
*G06F 19/00* (2006.01)

(52) U.S. Cl. ............................ 463/20; 463/16; 463/17; 463/18; 463/19; 463/21; 463/22; 463/25; 463/31; 463/32; 463/33; 463/34; 273/358; 273/359; 273/153 R

(58) Field of Classification Search ............. 463/16–22, 463/25, 31–34; 273/358–359, 153 R
See application file for complete search history.

(56) References Cited

U.S. PATENT DOCUMENTS

| | | | | |
|---|---|---|---|---|
| 5,833,537 | A * | 11/1998 | Barrie | 463/21 |
| 5,947,820 | A | 9/1999 | Morro et al. | |
| 6,287,194 | B1 * | 9/2001 | Okada et al. | 463/16 |
| 6,364,766 | B1 | 4/2002 | Anderson et al. | |
| 6,464,581 | B1 | 10/2002 | Yoseloff et al. | |
| 6,579,178 | B1 * | 6/2003 | Walker et al. | 463/20 |
| 6,685,561 | B2 | 2/2004 | Anderson et al. | |
| 7,092,899 | B2 * | 8/2006 | Simas et al. | 705/26 |
| 2002/0037764 | A1 * | 3/2002 | Anderson et al. | 463/16 |

* cited by examiner

*Primary Examiner*—Melba Bumgarner
*Assistant Examiner*—Jason Pinheiro
(74) *Attorney, Agent, or Firm*—K&L Gates LLP

(57) ABSTRACT

A method and gaming device, such as a slot machine, is disclosed that generates a spin results which are used to determine a player's progress toward a secondary or overall game objective. The secondary game objective may include completing a set or a collection. A game objective may instruct a player to attempt to assemble a picture or image. Portions of the complete image may be displayed on a first game area, such as the reel area of the gaming device. A player executing a spin on the gaming device may acquire or utilize portions of the image as they occur in the context of a reel-based game. Image portions may "occur" when they appear on the gaming device payline as part of a traditional reel-based game. The image portion may be utilized on a second game area of the gaming device (e.g. a screen located above the gaming device reel area) in order to depict progress toward the secondary game objective of completing the image.

27 Claims, 14 Drawing Sheets

330

| PERCENT COMPLETE 400 | PAYOUT 402 |
|---|---|
| 20% | 2 |
| 40% | 10 |
| 60% | 40 |
| 80% | 100 |
| 100% | 1000 |

FIG. 4

332

| IMAGE IDENTIFIER 500 | COMPLETED IMAGE CONTENT 502 | IMAGE PORTION CONTENT 504 | IMAGE CHARACTERIZATION CODE(S) 506 | COMPLEMENTARY REEL SYMBOL SET IDENTIFIER 508 |
|---|---|---|---|---|
| I555 | US_FLAG.BMP | F1.BMP | 246 | FLAGS25 |
| | | F2.BMP | | |
| | | F3.BMP | 357 | |
| | | ∘ ∘ ∘ | | |
| | | FN.BMP | 468 | |
| I556 | DOG.JPG | D1.JPG | 222 | PETS03 |
| | | D2.JPG | 333 | |
| | | D3.JPG | | |
| | | ∘ ∘ ∘ | 444 | |
| | | DN.JPG | 555 | |

FIG. 5

334

| IMAGE CHARACTERIZATION CODE(S) 600 | IMAGE CHARACTERIZATION DESCRIPTION 602 |
|---|---|
| 246 | COUNTRY SYMBOL |
| 357 | FLAG |
| 468 | UNITED STATES FLAG |
| 222 | ANIMAL |
| 333 | DOMESTICATED ANIMAL |
| 444 | HOUSEHOLD PET |
| 555 | DOG |

FIG. 6

336

| COMPLEMENTARY REEL SYMBOL SET IDENTIFIER | SYMBOL SET NAME 702 | REEL SYMBOLS 704 |
|---|---|---|
| FLAGS25 | FLAGS | BRITISH_FLAG.BMP |
| | | FRENCH_FLAG.BMP |
| | | KOREAN_FLAG.BMP |
| | | ISREALI_FLAG.BMP |
| | | JAPANESE_FLAG.BMP |
| | | SPANISH_FLAG.BMP |
| | | ITALIAN_FLAG.BMP |
| PETS03 | DOGS | BONE.JPG |
| | | DOG_HOUSE.JPG |
| | | BALL.JPG |
| | | DOG_BISCUIT.JPG |
| | | PAW_PRINTS.JPG |
| | | PUPPY.JPG |

FIG. 7

METHOD AND APPARATUS FOR PAYOUTS DETERMINED BASED ON A SET COMPLETION GAME

RELATED APPLICATIONS

This application claims priority to commonly-owned, co-pending U.S. Provisional Patent Application Ser. No. 60/451,620, filed Mar. 3, 2003, entitled "GAMING DEVICE AND METHOD OF GAMING DEVICE OPERATION," the entire content of which is incorporated herein by reference for all purposes.

This application is related to commonly-owned U.S. patent application Ser. No. 10/391,034, filed Mar. 17, 2003, entitled "ELECTRONIC AMUSEMENT DEVICE AND METHOD FOR OPERATING A GAME OFFERING CONTINUOUS REELS"; which is a continuation of U.S. patent application Ser. No. 09/578,261, filed May 24, 2000, entitled "ELECTRONIC AMUSEMENT DEVICE AND METHOD FOR OPERATING A GAME OFFERING REELS HAVING PUZZLE PIECES", which issued as U.S. Pat. No. 6,579,178 B1 on Jun. 17, 2003; which is a continuation of U.S. patent application Ser. No. 09/056,489, filed Apr. 7, 1998, entitled "ELECTRONIC AMUSEMENT DEVICE AND METHOD FOR OPERATING A GAME OFFERING CONTINUOUS REELS", which issues as U.S. Pat. No. 6,095,921 on Aug. 1, 2000.

This application is also related to commonly-owned U.S. patent application Ser. No. 10/778,576, filed Feb. 13, 2004, entitled "METHOD AND APPARATUS FOR ENHANCED PLAY OF A GAMING DEVICE"; which is a continuation-in-part of commonly-owned U.S. patent application Ser. No. 10/772,837, filed Feb. 5, 2004, entitled "ELECTRONIC AMUSEMENT DEVICE AND METHOD FOR ENHANCED SLOT MACHINE PLAY"; and a continuation-in-part of commonly-owned U.S. patent application Ser. No. 09/716,918, filed Nov. 20, 2000, entitled "ELECTRONIC AMUSEMENT DEVICE AND METHOD FOR ENHANCED SLOT MACHINE PLAY"; which is a continuation of commonly-owned U.S. patent application Ser. No. 09/164,473, filed Oct. 1, 1998, entitled "ELECTRONIC AMUSEMENT DEVICE AND METHOD FOR ENHANCED SLOT MACHINE PLAY", which issued as U.S. Pat. No. 6,203,430 B1 on Mar. 20, 2001.

This application is further related to commonly-owned U.S. patent application Ser. No. 09/606,745, filed Jun. 29, 2000, entitled "SYSTEMS AND METHODS FOR ALLOCATING AN OUTCOME AMOUNT AMONG A TOTAL NUMBER OF EVENTS".

This application is further related to commonly-owned U.S. patent application Ser. No. 10/361,201, filed Feb. 7, 2003, entitled "A GAMING DEVICE AND METHOD OF OPERATION THEREOF"; which is a continuation-in-part of U.S. patent application Ser. No. 09/521,875, filed Mar. 8, 2000, entitled "A GAMING DEVICE AND METHOD OF OPERATION THEREOF", which issued as U.S. Pat. No. 6,520,856 B1 on Feb. 18, 2003; which is a continuation of commonly-owned U.S. patent application Ser. No. 09/052,291, filed Mar. 31, 1998, entitled "A GAMING DEVICE AND METHOD OF OPERATION THEREOF", which issued as U.S. Pat. No. 6,068,552 on May 30, 2000.

The entirety of each of the above applications is incorporated by reference herein for all purposes.

FIELD OF THE INVENTION

The present invention relates to gaming and gaming devices. More specifically, the present invention relates to games involving set completion or collection.

BACKGROUND OF THE INVENTION

In the United States alone, gaming devices (e.g., reeled slot machines and/or video poker machines) generate more than $15 billion in annual revenue for casinos. In fact, revenue from gaming devices typically accounts for more than half of the gaming revenue for a United States casino. The situation is similar in other parts of the world in which gaming devices are popular, such as Europe and Australia. As a result, casino owners and operators are highly motivated to increase the level of enjoyment derived by gaming device players. Since casino profits are directly proportional to the amount wagered by patrons, casinos are further motivated to expand and retain share within their given market. Increased playing duration, average wager amount, and rate (i.e. speed) of play are key factors contributing to the profitability of casino gaming devices.

One way in which casinos have sought to boost profitability is to make the games offered by such gaming devices as entertaining and broadly appealing as possible. Many techniques are currently used to entertain and appeal to gaming device players. Such techniques include attractive colors and graphics; sound effects associated with winning payouts; thematic games (including games based on popular culture); and jackpots or "bonus rounds" that offer players the chance to win a large amount of money in exchange for a comparatively small wager.

While such techniques have made modern gaming devices more entertaining than the previous generation of machines, the overall range of entertainment options available to consumers continues to expand considerably. Individual casinos now compete not only with other casinos sharing the common market, but also with alternative forms of player entertainment such as Internet-based gaming, console and hand held video game devices, in-home theater systems, greatly expanded television and movie offerings, and the like.

Accordingly, a need continues to exist for enhancing the entertainment and overall appeal of gaming devices.

BRIEF DESCRIPTION OF THE DRAWINGS

FIG. 4 is a table illustrating an example data structure of a payout database for use in some embodiments of the present invention.

FIG. 5 is a table illustrating an example data structure of a image content database for use in some embodiments of the present invention.

FIG. 6 is a table illustrating an example data structure of an image characterization database for use in some embodiments of the present invention.

FIG. 7 is a table illustrating an example data structure of a complementary reel symbol set database for use in some embodiments of the present invention.

DETAILED DESCRIPTION OF EMBODIMENTS OF THE INVENTION

Figure 1:
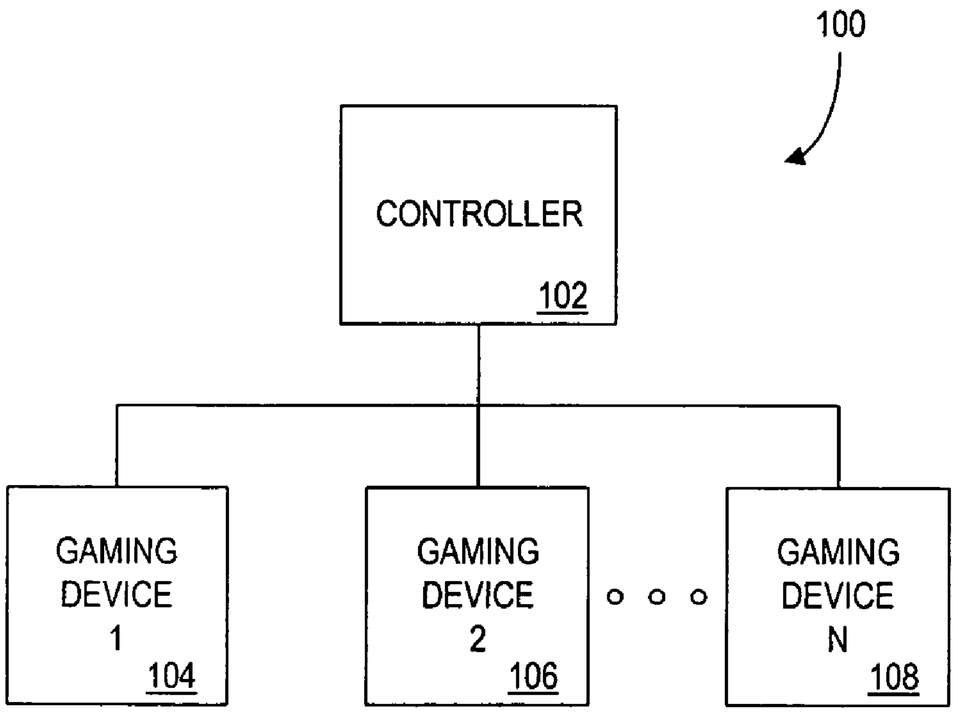
FIG. 1 is a block diagram illustrating an example system according to some embodiments of the present invention.

The invention overcomes the above and other drawbacks of the prior art by providing a gaming device, such as a slot machine, that operates to execute a plurality of spins or handle pulls wherein each of the plurality of spins generates a spin result, which is used to determine a player's progress toward a secondary or overall game objective. In some embodiments, the secondary game objective includes completing a set or a collection. For example, a game objective may instruct a player to attempt to assemble a picture or image. Portions of the total image may be displayed on a first game area, such as the reel area of the gaming device. A player executing a spin on the gaming device may acquire or be allowed to utilize portions of the image as they occur in the context of a reel-based game. For example, image portions may "occur" when they appear on the gaming device payline as part of a traditional reel-based game. Subsequently, the image portion may be utilized on a second game area of the gaming device (e.g. a screen located above the gaming device reel area) in order to depict progress toward the secondary game objective of completing the image.

Upon completion of a predetermined, prepaid number of spins and/or elapsed amount of time, the gaming device and/or a controller makes a determination as to what (if any) progress toward the game objective has been achieved (e.g. how complete the puzzle or image is). Based on the progress made, a payout or reward may be conferred to the gaming device player. In accordance with some embodiments of the present invention, a pay table is provided and may be utilized to establish appropriate payouts based on the level of progress made toward the overall objective (e.g. based on a percentage of completion).

Additional embodiments and aspects of the present invention provide means for utilizing player-input parameters in conducting the game and for ensuring the prevention of duplicative use of individual game elements (e.g. image portions). Further, some embodiments of the invention provide for the periodic expiration of certain previously-acquired game elements, symbols, or image portions. Likewise, some embodiments of the invention provide for the periodic expiration of certain game elements, symbols, or image portions that are available to be acquired.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, hardware, and electrical changes may be made without departing from the scope of the present invention. The following description is, therefore, not to be taken in a limited sense, and the scope of the present invention is defined by the appended claims. Referring to the drawings, note that the left most digit(s) of a reference numeral identifies the figure in which the reference numeral first appears. Also note that in block diagrams and tables, blocks and cells with identical labels but different reference numerals are intended to represent identical (or very similar) components in different contexts, environments, configurations, locations, networks, databases, and/or positions.

A. Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The term "controller" may refer to an electronic device (e.g., a computer) that communicates with one or more gaming devices. In a manner known in the art, the controller may be embodied as a computer server and may (i) control the actions of gaming devices and/or (ii) receive and store information associated with the gaming devices. For example, the controller may employ one or more databases to record gaming device statistics such as e.g. coin-in, coin-out, jackpot information, theoretical wins, etc.

The term "primary game" may refer to a gambling event (i.e. one or more chance-based event(s) executed in exchange for player consideration and yielding a potential prize) yielding a spin result. In accordance with the present invention, a primary game may be embodied as a reel-based slot machine game. Termination of the game may be established voluntarily (e.g. where a player elects to stop play) or involuntarily (e.g. where the gaming device terminates play based on the occurrence of a termination event).

The term "secondary game" may refer to a game employed by a gaming device characterized by an objective that is dependent on results achieved in a primary game. For example, a secondary game in accordance with the present invention may require a player to assemble a complete image from portions of the image obtained throughout the course of a primary game or primary game session. The object of a secondary game may be referred to as a secondary game objective or overall game objective.

The terms "secondary game result" and "cumulative outcome" shall be synonymous and may refer to an indication of a player's progress toward completing a defined objective. In accordance with the present invention, a game result may be expressed in a number of ways including e.g. a percentage of completion (e.g. 80% complete), a completion ratio (e.g. 15 of 28 steps completed), a collection of image portions combined together into a complete image or partial image, etc.

The term "gaming device" may refer to any electrical, mechanical, or electro-mechanical device operative to: accept wagers; execute a process to determine a spin result; based on the spin result, determine progress toward a game result; determine an game result, and provide entitlement to a prize based on (i) the spin result, (ii) the game result, or (iii) both (i) and (ii). The spin result may be generated or determined randomly (e.g. as with a slot machine) or through a combination of randomness and player skill (e.g. as with video poker). In accordance with the present invention, gaming devices may include slot machines (both video reel and mechanical reel), video poker machines, video blackjack machines, video roulette machines, video keno machines, video bingo machines, pachinko machines, video lottery terminals, hand held gaming devices, and the like.

The terms "spin" and "handle pull" shall be synonymous and may refer to an occurrence of the determination of a spin result. In accordance with the present invention, a spin yields a spin result that may be communicated to a player via a first game area of the gaming device. One or more spin result(s) may then be used to determine a secondary game result (i.e. an indication of progress toward an objective), which may be indicated to a player via a second game area of the gaming device. A player may initiate a spin by depositing currency or establishing credit with the gaming device and subsequently actuating a lever or designated button.

The term "spin result" may refer to the result of a player executing a given spin/handle pull. In accordance with the present invention, the spin result may be expressed in a number of ways. More specifically, the spin result may be expressed as a value (e.g. $5.00), as a factor based on which a value may be determined (e.g. 2× wager amount), or in any other suitable manner. In accordance with one embodiment of the invention, the spin result may be communicated graphically, as a series of discreet symbols appearing on a first game area of the gaming device. Further, as mentioned above, the spin result and any corresponding prize or payout may be generated or determined randomly or through a combination of randomness and player skill.

The term "payout" may refer to the actual prize, reward, winnings, or funds associated with a particular spin result and/or game result. Typically, the payout may be embodied as cash and/or credit dispensed or otherwise made available to the gaming device player. Alternatively, a payout may be embodied as goods or services to which the player may be entitled.

The term "peripheral device" may refer to a device operatively in communication with a gaming device and that is configured to assist in the operation of game-related functions.

The term "player tracking card" may refer to a means by which a casino owner or operator may identify an individual gaming device player and monitor and record certain information associated with the player. Typically, a player tracking card may be embodied as a plastic card bearing identifying indicia or encoded information via which the controller and/or gaming device may identify the player. Generally, the identifying information is used as an index to one or more database record(s), which store information associated with e.g. the demographics of the player and historical information associated with past play (if any).

The term "prepaid session" may refer to a duration of time or number of spins that are paid for in advance and subsequently utilized by the player. In accordance with some embodiments of the invention, the player may purchase (i.e. wager upon) a plurality of spins, following execution of which a game result may be determined and any resultant payout conferred to the player.

The terms "primary game area," "first game area," "main game area," and "lower game area" shall be synonymous and may refer to an area of the gaming machine's facade via which a player may be informed of a spin result. The first game area may include any number of appropriate output devices and/or display devices including a screen, audio output, mechanical reels and/or electronic representations of reels, etc.

The terms "secondary game area," "second game area," "upper game area," and "alternate game area" shall be synonymous and may refer to an area of the gaming machine's facade via which a player may be informed of a game result and/or a level of progress toward achieving an overall or secondary game objective. In accordance with some embodiments, the second game area may include one or more dedicated output devices and/or display devices for displaying or otherwise indicating progress toward a game result or game objective.

The term "termination event" may refer to one or more criteria that when satisfied instruct a gaming device and/or controller to evaluate a level of progress toward a secondary game objective having been achieved at a gaming device. For example, a termination event in accordance with the present invention may comprise the completion of a given number of spins and/or an elapsed duration of time (e.g. the end of a prepaid gaming session). Alternatively, a termination event may comprise the completion of the secondary game objective.

B. System

Turning to FIG. 1, the present invention can be configured to function as a system 100 in a network environment including a controller 102 (e.g., a slot server of a casino) that is in communication, via a communications network, with one or more gaming devices 104, 106, 108 (e.g., slot machines, video poker machines).

The controller 102 may communicate with the gaming device(s) 104, 106, 108 directly or indirectly, via a wired or wireless medium such as the Internet, LAN, WAN or Ethernet, Token Ring, or via any appropriate communications means or combination of communications means.

Each of the gaming devices 104, 106, 108 may comprise computers, such as those based on the Intel® Pentium® processor, that are adapted to communicate with the controller 102. Any number and type of devices may be in communication with the controller 102.

Communication between the devices (including the gaming devices 104, 106, 108) and the controller 102, and among the devices, may be direct or indirect, such as over the Internet through a web site maintained by controller 102 (e.g. where the controller hosts an on-line or virtual casino), on a remote server and/or over an on-line data network. Such data networks may include commercial on-line service providers, bulletin board systems and the like. In accordance with yet other embodiments, the devices may communicate with one another and/or the controller 102 via radio frequency (RF), cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link.

Possible communications protocols that may be part of the system include: Ethernet (or IEEE 802.3), SAP, ATP, Bluetooth™, and TCP/IP. Communication may be encrypted to ensure privacy and prevent fraud in any of a variety of ways known in the art (e.g. using hash functions or public/private key systems).

Those skilled in the art will understand that devices in communication with each other need not be continually transmitting to each other. On the contrary, such devices need only transmit to each other periodically or as necessary, and may actually refrain from exchanging data most of the time. For example, a device in communication with another device via the Internet may not transmit data to the other device for weeks at a time.

In accordance with some embodiments, a controller 102 (e.g., a server computer) may not be necessary and/or preferred. For example, the present invention may, in one or more embodiments, be practiced on a stand-alone gaming device 104 and/or a gaming device 104 in communication only with one or more other gaming devices 106, 108 and/or a controller 102. In such an embodiment, any function(s) described as being performed by the controller 102 or data described as stored at the controller 102 may instead be performed by or stored at one or more gaming devices 104.

Figure 2:
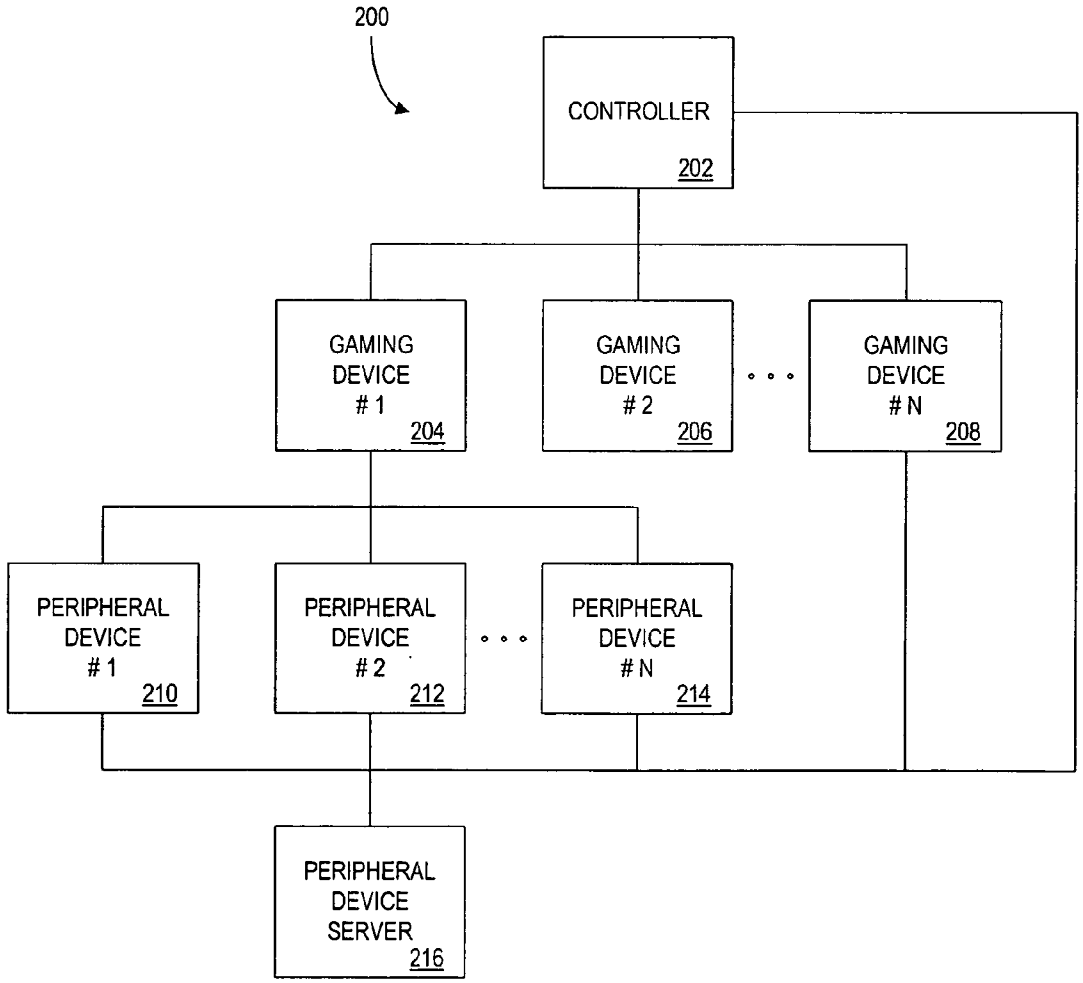
FIG. 2 is a diagram illustrating an example alternative system according to some embodiments of the present invention.

Turning to FIG. 2, an alternative system 200 according to at least one embodiment of the present invention may include a controller 202 (e.g., a slot server of a casino) that is in communication, via a communications network, with one or more gaming devices 204, 206, 208 (e.g., slot machines, video poker machines). A differentiating characteristic between the aforementioned system 100 and the alternative system 200 being that in the present system 200 at least one gaming device 204 is also in communication with one or more peripheral devices 210, 212, 214.

A peripheral device 210, 212, 214 may, in turn, be in communication with a peripheral device server 216 and, in some embodiments, with the controller 202. In one or more embodiments the peripheral device server 216 may be in communication with one or more gaming devices 208 and/or the controller 202.

The controller 202 may communicate with the devices (including the gaming devices 204, 206, 208) and peripherals 210, 212, 214, 216 directly or indirectly, via a wired or wireless medium such as the Internet, LAN, WAN or Ethernet, Token Ring, or via any appropriate communications means or combination of communications means. For example, the controller 202 may communicate directly with one of the gaming devices 204 (e.g., via a LAN) and indirectly (e.g., via a gaming device 204) with a peripheral device 210. In accordance with another example embodiment, the controller 202 may communicate with one of the gaming devices 206 via a LAN and with another of the gaming devices 208 via the Internet (e.g., if the particular gaming device 208 comprises a personal computer in communication with an online casino).

Each of the devices (including the gaming devices 204, 206, 208 and peripherals 210, 212, 214, 216) may comprise one or more computer(s), such as those based on the Intel® Pentium® processor, that are adapted to communicate with the controller 202. Further, each of the devices may comprise a gaming device such as an electronic, mechanical or electro-mechanical slot machine, video poker machine, video blackjack machine, video keno machine, pachinko machine, video roulette machine, and/or a lottery terminal. Further yet, each of the devices may comprise an external or internal module associated with one or more of the gaming devices 204, 206, 208 that is capable of communicating with one or more of the gaming devices 204, 206, 208 and of directing one or more gaming devices 204, 206, 208 to perform one or more functions. Any number of devices may be in communication with the controller 202. Any number and type of peripheral devices 210, 212, 214 may be in communication with a gaming device 204, peripheral device server 216 and/or the controller 202.

Communication between the devices and the controller 202, between the devices themselves, between the peripheral device server 216 and the devices, and between the peripheral device server 216 and the controller 202, may be direct or indirect. Such communications may include those such as over the Internet through a web site maintained by the controller 202, on a remote server or over an on-line data network. Such data networks may include commercial on-line service providers, bulletin board systems and the like. In yet other embodiments, any and all of the devices of the system 200 (i.e., the devices (including the gaming devices 204, 206, 208 and peripherals 210, 212, 214), the controller 202, and the peripheral device server 216) may communicate with one another over RF, cable TV, satellite links and the like.

Some, but not all, possible communication networks that may comprise the network or otherwise be part of the system include: a local area network (LAN), a wide area network (WAN), the Internet, a telephone line, a cable line, a radio channel, an optical communications line, a satellite communications link.

Possible communications protocols that may be employed by the system include: Ethernet (or IEEE 802.3), SAP, ATP, Bluetooth™, and TCP/IP among others. Such communications may be encrypted or otherwise encoded to ensure privacy and prevent fraud in any of a variety of ways known in the art (e.g. using hash functions and/or public/private key systems).

In some embodiments, the controller 202 may not be necessary and/or preferred. For example, the present invention may, in one or more embodiments, be practiced on a stand-alone gaming device 204, on one or more gaming devices 204 in communication with one or more peripheral devices 210, on one or more gaming devices 208 in communication with a peripheral device server 216, on one or more peripheral devices 214 in communication with a peripheral device server 216, and/or on a gaming device 206 in communication only with one or more other gaming devices 208. In such embodiments, any functions described as performed by the controller 202 or data described as stored in the memory of the controller 202 may instead be performed by or stored on one or more gaming device(s) 204, 206, 208, one or more peripheral device(s) 210, 212, 214, and/or peripheral device server(s) 216.

Similarly, a peripheral device server 216 may not be desired and/or needed in some embodiments of the present invention. In such embodiments that do not involve a peripheral device server 216, any or all of the functions described herein as being performed by a peripheral device server 216 may instead be performed by the controller 202, one or more gaming devices 204, 206, 208, one or more peripheral devices 210, 212, 214, or a combination thereof.

Similarly, in embodiments that do not involve a peripheral device server 216 any data described herein as being stored in a memory of a peripheral device server 216 may instead be stored in a memory of another server computer (e.g. the controller 202), one or more gaming devices 204, 206, 208, one or more peripheral devices 210, 212, 214, or a combination thereof.

Any or all of the gaming devices 204, 206, 208 may, respectively, include or be in communication with a peripheral device 210, 212, 214. A peripheral device 210 may be a device that receives information from (and/or transmits information to) one or more gaming devices 204, 206, 208. For example, a peripheral device 210 may be operable to receive information about games being played on a gaming device 204, such as the initiation of a game, a random number that has been generated for a game, the result or outcome of a handle pull, spin or gaming session at the gaming device, etc.

In one or more embodiments, one or more such peripheral devices 210 may be in communication with a peripheral device server 216. This enables the peripheral device server 216 to receive information regarding a plurality of games being played on a plurality of gaming devices 204, 206, 208. The peripheral device server 216, in turn, may be in communication with the controller 202. It should be understood that any functions described herein as performed by a peripheral device 210 may also or instead be performed by the peripheral device server 216.

Similarly, any data described herein as being stored on or accessed by a peripheral device 210 may also or instead be stored on or accessed by the peripheral device server 216. A peripheral device 210 may be operable to access a database (e.g., of a peripheral device server 216) to provide benefits (e.g., cashless gaming receipts) based on, for example, an outcome of a game and or a gaming session at the gaming device 204.

The peripheral device server 216 may also monitor player gambling history over time by associating gambling behavior with player identifiers, such as player tracking card numbers. For example, information about the player obtained or accessed by a peripheral device server 216 may be analyzed, e.g., to identify those players that a particular gaming machine owner, operator, or manufacturer finds most desirable. Based upon desired objectives, the peripheral device server 216 may direct the appropriate peripheral device 210 to issue customized messages, images, offers, and games to specific players.

Information received by a peripheral device 210 from a gaming device 204 may include gambling data such as number of games initiated per unit of time, outcomes displayed for games initiated, payouts corresponding to outcomes displayed, a credit meter balance of the gaming device, and/or data associated with the player currently playing the gaming device.

The functions described herein as being performed by a peripheral device server 216 and/or a peripheral device 210 may, in one or more embodiments, be performed by the controller 202 (e.g. in lieu of (or in conjunction with) being performed by a peripheral device server 216 and/or a peripheral device 210).

In one or more embodiments, a peripheral device 210 may be useful for implementing the embodiments of the present invention into the operation of a gaming device 204. For example, in order to avoid or minimize the necessity of modifying or replacing a program already stored in a memory of a conventional gaming device 204, an external or internal module that comprises a peripheral device 210 may be added to, coupled to, or otherwise associated with the gaming device 204.

Thus, for example, a peripheral device 210 may be utilized to monitor play of the gaming device 204 and display or output messages, images, image portions and/or an overall outcome of a game. In such embodiments the gaming device 204 with which the peripheral device 210 is in communication may continue to operate. In such embodiments the gaming device 204 may output an outcome for each spin or handle pull and overall game progress (e.g. the completion of a puzzle) may be indicated or output by the peripheral device 210. The peripheral device 210 may further output a secondary game outcome or secondary game payout when appropriate.

The peripheral device 210 may also output messages to the player. For example, the peripheral device 210 may be embodied as a player tracking system including a screen for outputting messages and/or game status information to the player.

The peripheral device may also provide benefits to a player (e.g., coins, tokens, electronic credits, paper receipts exchangeable for cash, services, and/or merchandise).

Accordingly, a peripheral device 210 may include (i) a communications port (e.g., for communicating with one or more gaming devices 204, peripheral device server 216, another peripheral device 212, and/or a computer); (ii) a display (e.g., for displaying messages and/or outcomes and payouts), (iii) another output means (e.g., a speaker, light, or other device for communicating with a player), and/or (iv) a benefit providing means (e.g., a printer and paper dispensing means, a credit meter, and/or a hopper and hopper controller).

In one or more embodiments, the peripheral device 210 may not output outcomes and/or messages to a player but may instead direct the processor of a gaming device 204 to perform such functions. For example, a program stored in a memory of peripheral device 210 may cause a processor of a gaming device 204 to perform certain functions. More specifically, a program stored in a memory of peripheral device 210 may cause a processor of a gaming device 204 to output an outcome, determine an outcome, output a message, access a database, provide a benefit, refrain from providing a benefit (e.g., by not sending a signal to a hopper controller of the gaming device 204 not to dispense tokens when it otherwise normally would), and/or communicate with another device.

Examples of peripheral devices 210 include e.g. (i) electronic apparatuses "retrofitted" to conventional gaming devices 204 so that inventive processes disclosed herein may be realized through game play at the gaming device 204, (ii) Personal Digital Assistants (PDAs) such as those manufactured by Palm, Inc., (iii) lap top computers, (iv) cellular telephones, (v) pagers, and/or (vi) any appropriate combination thereof.

C. Device

Figure 3:
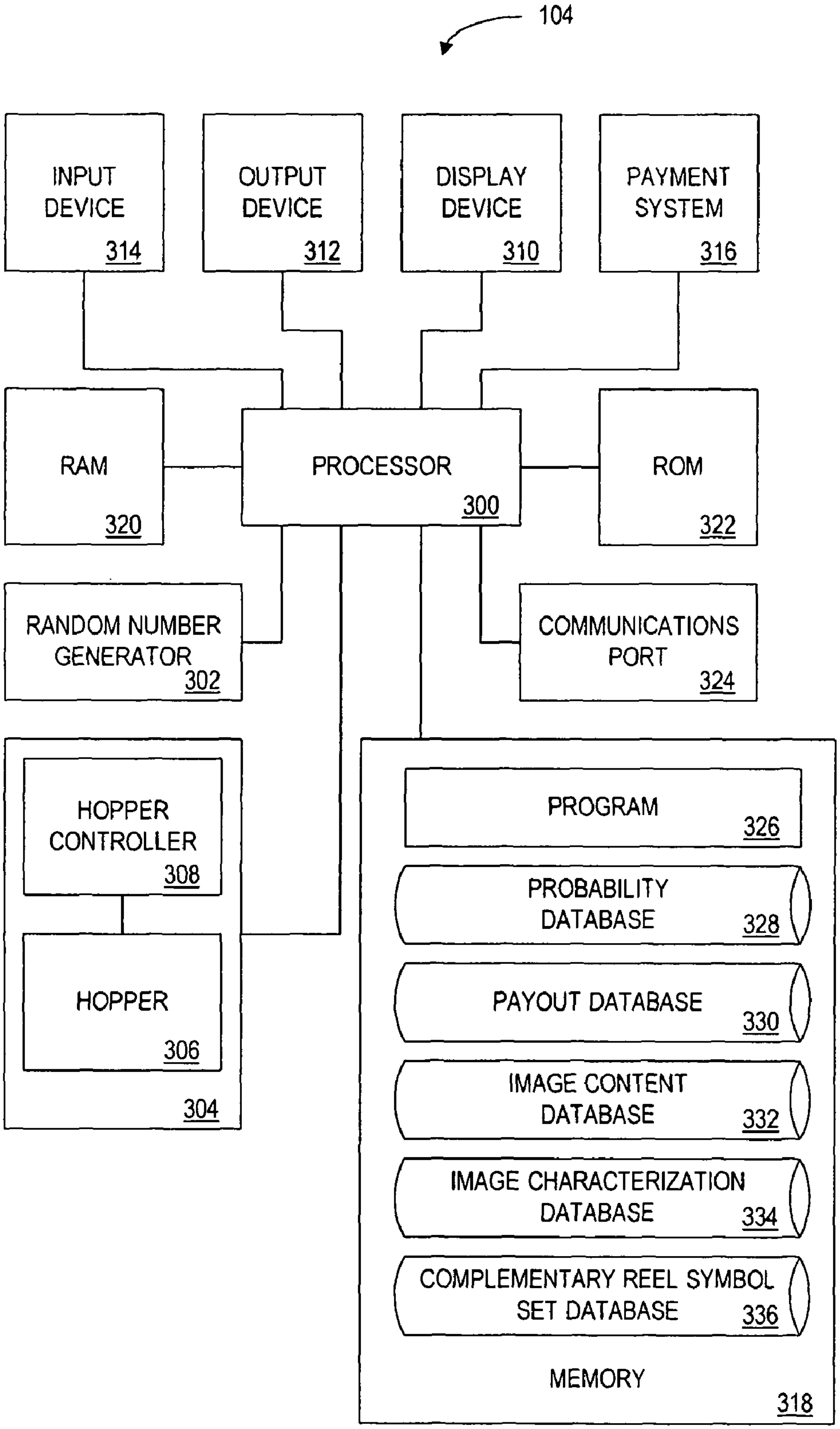
FIG. 3 is a diagram illustrating an example gaming device according to some embodiments of the present invention.

Turning to FIG. 3, in accordance with the present invention, a gaming device 104/204 may be implemented as a system controller, a dedicated hardware circuit, an appropriately programmed general-purpose computer, or any other equivalent electronic, mechanical or electromechanical device. (Note that from this point forward, each reference to a "gaming device" followed by the reference numeral 104 is intended to be equivalent to a reference to any of the gaming devices from either system 100 or system 200.)

The gaming device 104 may comprise, for example, a slot machine, a video poker machine, a video blackjack machine, a video keno machine, a video lottery machine, a pachinko machine or a tabletop game.

In various embodiments, a gaming device 104 may comprise, for example, a personal computer (e.g., which communicates with an online casino via a Web site), a telephone (e.g., to communicate with one or more remote gaming services), or a portable handheld gaming device (e.g., a PDA). The gaming device 104 may comprise any or all of the gaming devices of the aforementioned systems.

In some embodiments, a user device such as a PDA or cell phone may be used in place of, in combination with, or in addition to, some or all of the gaming device components. In one or more embodiments, the gaming device 104 may comprise a computing device operable to execute software that simulates play of a reeled slot machine game, video poker game, video blackjack game, video keno game, video roulette game, and/or lottery game.

The gaming device 104 disclosed herein comprises a processor 300, such as one or more Intel® Pentium® processors. The processor 300 is in operative communication with at least one random (or pseudo-random) number generator 302, which may be a component of the gaming device 104.

The random number generator 302, in accordance with at least one embodiment of the present invention, may generate data representing random or pseudo-random values (referred to as "random numbers" herein). The random number generator 302 may generate a random number every predetermined unit of time (e.g., every thousandth of a second) or in response to an initiation of a game on the gaming device 104. In the former embodiment, the generated random numbers may be used as they are generated (e.g., the random number generated at substantially the time of game initiation is used for that game) and/or stored for future use.

A random number generated by the random number generator 302 may be used by the processor 300 to determine, for example, at least one of an outcome, a reel position, an arrangement of symbols and a payout. A random number generator 302, as used herein, may be embodied as a secondary (e.g. tamper-evident) processor separate from but working in cooperation with a primary gaming device processor 300.

Alternatively, the random number generator 302 may be embodied as an algorithm, program component, or software stored in the memory of the gaming device and used to generate a random number.

Note that, although the generation or obtainment of a random number is described herein as involving a random number generator 302 of a gaming device 104, other methods of determining a random number may be employed. For example, a gaming device owner or operator may obtain sets of random numbers that have been generated by another entity. For example, HotBits™ is a service that provides random numbers that have been generated by timing successive pairs of radioactive decays detected by a Geiger-Muller tube interfaced to a computer. Various methods and devices for generating and using random numbers for gambling purposes will be apparent to one of skill in the art.

The processor 300 may further be operable to communicate with a benefit output device 304, which may be a component of gaming device 104. For example, the benefit output device 304 may comprise one or more devices for outputting a benefit to a player of the gaming device 104. In accordance with some embodiments, the gaming device 104 may provide coins and/or tokens as a benefit (e.g. a spin payout or a game payout). In accordance with such an embodiment the benefit output device 304 may comprise a hopper 306 coupled to a hopper controller 306, for dispensing e.g. coins and/or tokens into a coin tray of the gaming device.

In another example, the gaming device 104 may provide a receipt or other document on which there is printed an indication of a benefit (e.g., a cashless gaming receipt that has printed thereon an indication of a monetary value, which is redeemable for cash in the amount of the monetary value). In accordance with such an embodiment, the benefit output device 304 may comprise a printing and document dispensing mechanism or ticket-in/ticket-out device (not pictured).

According to yet another embodiment, the gaming device may provide electronic credits as a benefit (which, e.g., may be subsequently converted to coins and/or tokens and dispensed from a hopper into a coin tray). In such an embodiment the benefit output device 304 may comprise or include a credit meter balance and/or a processor that manages the amount of electronic credits that is indicated on a display of a credit meter balance.

In accordance with another embodiment, the gaming device 104 may credit a monetary amount to a financial account associated with a player. The financial account may be, for example, a credit card account, a debit account, a charge account, a checking account, and/or a casino account. In such an embodiment the benefit output device 304 may comprise a device for communicating with a server on which the financial account is maintained.

Note that, in one or more embodiments, the gaming device 104 may include more than one benefit output device 304. For example, the gaming device may include both a hopper 306 and hopper controller 308 combination and a credit meter balance (not pictured). Accordingly, the gaming device 104 of the present invention may be operable to provide more than one type of benefit to a player of the gaming device 104.

Alternatively, a single benefit output device 304 may be operable to output more than one type of benefit. For example, a benefit output device 304 may be operable to increase the balance of credits in a credit meter and communicate with a remote device in order to increase the balance of a financial account associated with a player.

The processor is also operable to communicate with a display device 310, which may be a component of the gaming device 104. The display device 310 may comprise, for example, one or more display screens or areas for outputting information related to game play on the gaming device. For example, the display device 310 may comprise or include a cathode ray tube (CRT) monitor, liquid crystal display (LCD) screen, or light emitting diode (LED) screen. In one or more embodiments, a gaming device 104 may comprise more than one display device 310. For example, a gaming device 104 may comprise a first game area having an LCD display for displaying electronic representations of reels and a second game area comprising a second LCD for displaying broader game objective information (e.g. various image portions having been secured by the player).

A display device 310 may comprise, for example, one or more display areas. For example, one of the display areas may display outcomes of spins or handle pulls played on the gaming device (e.g., on electronic reels of a gaming device). A second display area may display information associated with a player's progress toward a broader game objective. A third display area may display e.g. the benefits obtainable by playing a game of the gaming device (e.g., in the form of a payout table). In one or more embodiments, the gaming device 104 may include more than one display device 310, one or more other output devices 312, or a combination thereof (e.g., an upper game area, a lower game area, a credit meter, and left and right audio speakers).

As suggested above, the processor 300 may also be in communication with one or more other devices besides the display device, for outputting information (e.g., to a player or another device). Such other output devices 312 may also be components of the gaming device 104 of the present invention. Such devices 312 may comprise, for example, an audio speaker (e.g., for outputting an outcome or information related thereto, in addition to or in lieu of such information being output via a display device 310), an infra-red transmitter, a radio transmitter, an electric motor, a printer (e.g., such as for printing cashless gaming vouchers), a coupon or product dispenser, an infra-red port (e.g., for communicating with a second gaming device 106 or a portable device of a player), a Braille computer monitor, and a coin or bill dispenser.

For gaming devices 104, common output devices 312 include a cathode ray tube (CRT) monitor on a video poker machine, a bell on a gaming device 104 (e.g., rings when a player wins), an LED display of a player's credit balance on a gaming device 104, an LCD display of a personal digital assistant (PDA) for displaying keno numbers, etc.

The processor 300 may also be in communication with an input device 314, which is a device that is capable of receiving an input (e.g., from a player or another device) and which may be a component of gaming device 104. An input device 314 may communicate with or be part of another device (e.g. a server, a gaming device, etc.).

Exemplary input devices 314 include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, and an infrared port (e.g., for receiving communications from a second gaming device or from a another device such as a smart card or PDA of a player).

With respect to the gaming device 104 of the present invention, additional or alternative input devices 314 may include one or more button(s) or touch-screen(s) (e.g. on a slot machine), a lever or handle connected to the gaming device, a magnetic stripe reader (e.g. to read a player tracking card inserted into a gaming device), a touch-screen for input of player selections during game play, and a coin and bill acceptor.

The processor 300 may also be in communication with a payment system 316, which may be a component of the gaming device 104. The payment system 316 may be a device capable of accepting payment from a player (e.g., a bet or establishment of a balance) and/or providing payment to a player (e.g., a spin payout and/or a game payout). Payment may not be limited to money, but may also include other types of consideration, including products, services, and alternate currencies. Exemplary methods of accepting payment by the payment system 316 include (i) receiving currency (i.e., coins, tokens or bills). Accordingly, the payment system 316 may comprise a coin or bill acceptor.

In accordance with other embodiments of the invention, the payment system 316 may receive payment via an alternate currency (e.g., a paper cashless gaming voucher, a coupon, a non-negotiable token). Accordingly the payment system 316 may comprise a bar code reader or other sensing means. In some embodiments, a payment system 316 may operate to receive a payment identifier (e.g., a credit card number, a debit card number, player tracking card number, etc.) and to debit an account identified by the payment identifier.

The processor is additionally in communication with a memory and a communications port 324 (e.g., for communicating with one or more other devices). The memory may comprise any appropriate combination of magnetic, optical and/or semiconductor memory, and may include, for example, Random Access Memory (RAM) 320, Read-Only Memory (ROM) 322, a compact disc and/or a hard disk 318. That is, the memory may comprise or include any type of computer-readable medium. The processor 300 and the memory may each be, for example: (i) located entirely within a single computer or other device; or (ii) connected to each other by a remote communication medium, such as a serial port cable, telephone line or radio frequency transceiver. In one embodiment, the gaming device 104 may comprise one or more devices that are connected to a remote server computer for maintaining databases.

The memory stores a program 326 for controlling the processor 300. The processor 300 performs instructions of the program 326, and thereby operates in accordance with the present invention, and particularly in accordance with the methods described in detail herein.

The program 326 may be stored in a compressed, uncompiled and/or encrypted format. The program 326 furthermore includes program elements that may be necessary, such as an operating system, a database management system and "device drivers" for allowing the processor 300 to interface with computer peripheral devices. Appropriate program elements are known to those skilled in the art, and need not be described in detail herein.

The terms "computer-readable medium" and "computer-readable media" as used herein are synonymous and may refer to any medium that stores and/or participates in providing instructions to the processor 300 of the gaming device 104 (or any other processor of a device described herein) for execution. Such a medium may take many forms, including but not limited to, non-volatile media, volatile media, and transmission media. Exemplary non-volatile media include e.g. optical or magnetic disks, such as compact discs (CDs), Digital Versatile Discs (DVDs), etc. Exemplary volatile media may include dynamic random access memory (DRAM), which typically constitutes the main memory. Transmission media include coaxial cables, copper wire and fiber optics, including wires comprising a system bus coupled to the processor. Transmission media may carry acoustic or light waves, such as those generated during radio frequency (RF) and infrared (IR) data communications.

Exemplary forms of computer-readable media include, for example, a floppy disk, a flexible disk, hard disk, magnetic tape, other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read data.

Various forms of computer readable media may be involved in carrying one or more sequences of one or more instructions to processor 300 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 104 (or, e.g., a server) can receive the data via telephone line and use an infrared transmitter to convert the data to an infrared signal. An infrared detector can receive the data carried in the infrared signal and place the data on a system bus for the processor 300. The system bus may transmit the data to main memory, from which the processor 300 retrieves and executes the instructions. The instructions received by main memory may optionally be stored in memory either before or after execution by the processor 300. In addition, instructions may be received via a communication port 324 as electrical, electromagnetic or optical signal(s), which are exemplary forms of carrier waves that carry data streams representing various types of information.

According to some embodiments of the present invention, the instructions of the program 326 may be read into a main memory (e.g., RAM 320) from another computer-readable medium, such as from a ROM 322. Execution of sequences of the instructions in the program 326 may cause the processor 300 to perform the process steps described herein.

In accordance with alternate embodiments of the present invention, hard-wired circuitry may be used in place of (or in combination with) software instructions for implementation of the processes of the present invention. Thus, embodiments of the present invention are not limited to any specific combination of hardware and software.

As discussed with respect to aforementioned systems 100, 200, execution of sequences of the instructions in a program of a peripheral device 210 in communication with the gaming device 204 may also cause the processor 300 to perform some of the process steps described herein.

The gaming device 104 and/or controller 102 memory also stores a plurality of databases including (i) a probability database 328, (ii) at least one payout database 330, (iii) an image content database 332, (iv) an image characterization database 334, and (v) a complementary reel symbol set database 336. Each of the aforementioned databases will be described in detail herein below. Some or all of the data stored in each database is additionally described in conjunction with the description of the process steps also described herein below.

The described or illustrated entries of the databases represent exemplary information only. Those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Note that, although these databases may be described as being stored in a gaming device, in other embodiments of the present invention some or all of these databases may be partially or wholly stored in another device, such as one or more of the peripheral devices, the peripheral device server and/or the controller.

Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the controller.

As discussed herein, in one or more embodiments the gaming device 104 may take the form of a slot machine configured to operate in conjunction with the present invention. Generally, a slot machine for use in the present invention comprises (i) a first game area, operative to display or conduct a reel-based slot machine game (e.g. a three reel or five reel slot machine game) and (ii) a second game area operative to display or conduct a secondary game based on results of the reel-based game. For example, a secondary game may compel a player to attempt to assemble (to the extent possible) a complete image from a plurality of image portions occurring within the context of the reel-based game, as described above.

The gaming device's first game area may include a display area in which an outcome for a game of the reel-based slot machine game is displayed to the player. The first game area may be embodied, for example, as a video display that displays graphical representations of reels. The first game area may, in another example, be glass behind which mechanical reels are located.

The first game area may further include a payline. In accordance with one or more embodiments of the present invention, a spin result is a set of symbols displayed along a payline of a reeled slot machine (i.e. the first game area).

The slot machine may further comprise means for initiating a reel-based game, such as a handle or dedicated button. A player may initiate the movement of the reels in the first game area by pulling the handle or actuating the button. Either or both of the handle and start button are exemplary embodiments of an input device 314, described herein above.

The gaming device 104 of the present invention may further comprise a second game area, for outputting information to a player. The second game area may be utilized, for example, to inform a player of his or her level of progress toward a game objective, such as assembling a completed image from a plurality of image portions. For example, the secondary game area may display information including image portions having been secured by the player as they relate to the completed image. In addition, the secondary game area may be utilized to inform a player of a level of completion of the game objective upon completion of a terminating event. Such an event may comprise an amount of elapsed time (e.g. 3 minutes) and/or a given number of spins or handle pulls (e.g. 100 pulls). As mentioned above, the player's progress may be indicated in any number of ways including but not limited to e.g. a percentage (e.g. 80% complete) and/or a ratio (e.g. 15 of 24 images secured).

The slot machine may also include a payment system 316, which may be comprised of a bill acceptor, a credit card reader, and/or a coin acceptor. A player may utilize the gaming device payment system 316 to establish a credit balance with the machine 104, to provide a wager as consideration for a given spin or handle pull and/or to receive payment for achieving a favorable result in the primary and/or secondary game(s).

The slot machine may further comprise a credit meter balance. The gaming device credit meter balance may operate to indicate an amount of electronic credits currently available to a player, as described above. The player may use the credits, for example, as wagers or consideration for primary or secondary games played on the gaming device. When appropriate, the electronic credits may be "cashed out" as coins, bills, tokens, a cashless gaming receipt, and/or credits to another financial account associated with the player.

Finally, the slot machine may comprise a hopper 306, hopper controller 308, and coin tray (not pictured). Dispensing coins or tokens into the coin tray may render payment to the player. Such coins may be dispensed based on, for example, a player's indication that the player would like to cash out his credit meter balance and/or a payout obtained by a player as a result of playing a primary or secondary game on the slot machine. Note that, where appropriate, the slot machine may comprise alternative and/or additional components besides (or in addition to) those discussed herein.

D. Databases

As indicated above, it should be noted that although the example embodiments depicted in FIG. 3 include five particular databases 328, 330, 332, 334, 336 stored on a hard disk memory 318, other database arrangements may be used which would still be in keeping with the spirit and scope of the present invention. In other words, the present invention could be implemented using any number of different database files or data structures, as opposed to the five depicted in FIG. 3. Further, the individual database files could be stored on different devices (e.g. located on different storage devices in different geographic locations, such as on a third-party server). Likewise, the program 326 could also be located remotely from the hard disk memory 318 and/or on another server. As indicated above, the program 326 may include instructions for retrieving, manipulating, and storing data in the databases 328, 330, 332, 334, 336 as may be useful in performing the methods of the invention as will be further described below.

1. Probability Database

Where appropriate, a probability database may be utilized in the performance of the inventive processes described herein. More specifically, a probability database may be stored in a data storage device (e.g. of the gaming device and/or controller) in tabular form, or any other appropriate database form, as is known in the art.

The data stored therein may include a number of exemplary records or entries, each defining a random number. Those skilled in the art will understand that the probability database may include any number of entries. The tabular representation may also define fields for each of the entries or records. The fields may specify: (i) a random number or range of random numbers that may be generated by the random number generator; and (ii) an outcome, that indicates the one or more indicia comprising the outcome that corresponds to the random number of a particular record.

A gaming device may utilize a probability database to determine, for example, which outcome corresponds to a random number generated by a random number generator and to display the determined outcome in accordance with a reel-based game (e.g. a three-reeled game). For example, the outcome may comprise the three symbols to be displayed along the payline of a three-reel slot machine.

Other arrangements of probability databases or probability tables are possible. For example, the book "Winning At Slot Machines" by Jim Regan (Carol Publishing Group Edition, © 1997), the entirety of which is incorporated by reference herein for all purposes, illustrates examples of probability tables and how they may be derived.

2. Payout Database

Where appropriate, one or more payout database(s) may be utilized in the performance of the inventive processes described herein. More specifically, a first payout database may be employed for purposes of conducting a reel-based slot machine game at the gaming device. Further, a second payout database may be employed for purposes of conducting a secondary game at the gaming device. More specifically, the first payout database may be used to determine payouts to be awarded to players for achieving favorable outcomes during a reel-based slot machine game (e.g. three matching symbols on the machine's payline). The second payout database may be used to determine an appropriate award for achieving a level of completion associated with a secondary game objective. In accordance with the invention, the secondary game objective may compel the player to attempt to assemble a completed image from a plurality of image portions occurring within the context of a reel-type slot machine game.

In accordance with various embodiments of the present invention, the one or more payout database(s) may be stored at the gaming device and/or controller in tabular form, or any other appropriate database form, as is well known in the art.

The data stored therein includes a number of example records or entries, each defining an outcome that may be obtained on a gaming device that corresponds to a payout. For purposes of the reel based game, the first payout table may comprise a field defining various symbol combinations stored in correlative relation to information defining an award that may be conferred to a player for having achieved the symbol combination.

For purposes of the secondary game, the second payout table may comprise a field indicating levels or amounts of progress toward an overall game objective, such as assembling a completed image from a plurality of available image portions that may occur within the context of a reel-based game. The individual indications of progress may be stored in correlative relation to an amount of payout or award to be conferred or entitled to the player in exchange for achieving the corresponding level of progress. For example, FIG. 4 illustrates a sample payout database 330 suitable for use with the secondary game. The first example field is a percent complete field 400 that lists different thresholds a player must meet to win the corresponding payout amount listed in the payout field 402. Thus, for example, to win 100 credits, a player must acquire 80% or more image pieces or, in some embodiments, progress 80% or more through a game.

Those skilled in the art will understand that the payout database(s) may include any number of entries. Other arrangements of payout databases are possible. For example, the book "Winning at Slot Machines" by Jim Regan incorporated above, illustrates examples of payout tables and probability tables (described above) and how they may be derived.

3. Image Content Database

Turning to FIG. 5, in accordance with the present invention, a data storage device or hard disk memory 318 of the gaming device 104 and/or the controller 102 may operate to store an image content database 332. Generally, the gaming device 104 and/or the controller 102 may utilize the image content database 332 to store completed image content as well as image portion content for use in conducting a game as described herein. In addition, the image content database 332 may be utilized to store general characterization information regarding the image content as well as an indication of a complementary reel symbol set associated with the image. Specific uses for image characterization information and complementary reel symbol set information will be described in detail below.

According to some embodiments of the invention, the image content database 332 may be stored in tabular form at either (or both) the gaming device 104 and/or controller 102. In accordance with other embodiments of the invention, the image content database 332 may be stored at any location and in any form that is practicable.

The image content database 332 may include any number of records or entries. The database may define fields for each of the entries including (i) an image identifier field 500, (ii) a completed image content field 502, (iii) an image portion content 1-N fields 504, (iv) image characterization code 1-N fields 506, and (v) a complementary reel symbol set identifier field 508.

For each record or entry in the image content database 332, an image identifier field 500 stores a unique numeric, alphanumeric or other type of code that uniquely identifies the image defined by the corresponding entry. The image identifier 500 may be generated and assigned e.g. by an administrator of the system of the present invention.

For each record or entry, a completed image content field 502 stores information that may be used by the gaming device 104 and/or the controller 102 for purposes of generating and displaying a completed image to a gaming device player, in accordance with the game described herein above. More specifically, the information stored in the completed image content field 502 may comprise a graphical file (or pointer to a file) in a format displayable by the gaming device 104. For example, the information stored in this field may comprise a JPEG file, an MPEG file, a BMP file, an AVI file, a file in proprietary format (such as those employed by various digital camera manufacturers), etc.

For each record or entry in the image content database 332, image portion content 1-N fields 504 store any number of image portions (i.e. an indication of the content of the image portions) associated with the completed image of the corresponding record. For example, in the context of the game described above wherein image portions are employed to represent pieces of a puzzle and wherein a completed puzzle represents a completed image, the information stored in the image portion content fields 1-N 504 may represent a first puzzle piece (e.g., "F1.BMP") and an Nth puzzle piece (where N represents an integer>1) (e.g., FN.BMP). Similar to the information stored in the completed image content field 502 described above, the information stored in the image portion content fields 1-N 504 may comprise a graphical file (or pointer to a file) in a format displayable by the gaming device. For example, the information stored in these fields may comprise a JPEG file, an MPEG file, a BMP file, an AVI file, a file in a proprietary format (such as those employed by various digital camera manufacturers), etc.

For each record or entry of the image content database 332, image characterization code fields 1-N 506 store information representing a code that represents a characterization of the image defined by the corresponding entry. In accordance with some embodiments of the invention, the information stored in this field is indexed to the image characterization database 334 (described below) and is utilized to identify various properties of the corresponding image. For example, where the completed image is embodied as content depicting a household pet, the information stored in a first image characterization code field 506 may identify the image as depicting an animal by storing the code "222" which represents "ANIMAL" as indicated by the fourth entry in the image characterization database 334 depicted in FIG. 6. An Nth image characterization code may identify the image as depicting a dog by storing the code "555" which represents "DOG" as indicated in the example image characterization database 334 in FIG. 6. In this manner, various images may be associated with various image characteristics, which may form the basis for image selection and presentation at a gaming device 104, as will be discussed further herein below.

For each record or entry of the image content database 332, a complementary reel symbol set identifier field 508 stores information identifying a set of reel symbols that may be employed in a reel-based game and which are complementary to the image defined by the corresponding entry. The complementary reel symbol set identifier field 508 provides an index into the complementary reel symbol set database 336 of FIG. 7. For example, where the image is that of, e.g., a domesticated animal such as a dog, the complementary reel symbol set may include icons or images associated with that particular theme. For example, the reel symbols employed in such a scenario may include dog-related icons or images (e.g. a doghouse, a bone, a ball, etc.). As a more specific example, note that the complementary reel symbol set identifier "PETS03" listed in the "I556" entry of the image content database 332 corresponds to the "BONE.JPG; DOG_HOUSE.JPG; BALL.JPG; DOG_BISCUIT.JPG; PAW_PRINTS.JPG; PUPPY.JPG" reel symbols 704 entry in the complementary reel symbol set database 336 of FIG. 7. This particular aspect of the present invention will be described in further detail herein below with respect to the complementary reel symbol set database 336.

4. Image Characterization Database

Turning to FIG. 6, in accordance with the present invention, the data storage device or hard disk memory 318 of the gaming device 104 and/or the controller 102 may operate to store an image characterization database 334. Generally, the gaming device 104 and/or the controller 102 may utilize the image characterization database 334 to store information defining various image characterization codes and descriptions associated with those codes. The gaming device 104 and/or the controller 102 may utilize the image characterization codes in order to determine an appropriate completed image to be displayed to a gaming device player, in accordance with the example games described herein. For example, a player may establish a pattern of selecting images for use in the game, the images sharing a common characteristic. Based on that information, the gaming device 104 and/or the controller 102 may determine or otherwise select images for presentation to (and selection by) a player in subsequent game instances.

The image characterization database 334 may comprise a plurality of records or entries. The database itself may be stored in tabular form or any other form that is practicable (e.g. object-based). The database defines fields for each of the entries, including (i) an image characterization code field 600 and (ii) an image characterization description field 602. The information stored in the image characterization database 334 may be created and updated by e.g. an administrator of the system described herein.

For each record or entry, an image characterization code field 600 may store a unique numeric, alphanumeric or other type of code that uniquely identifies the image characterization of the corresponding record. For example, the code "444" identifies the image characterization "HOUSEHOLD PET."

For each image characterization code 600 stored in the previously described field, an image characterization description field 602 may store e.g. a textual description of an image characterization associated with the code of the corresponding record or entry, e.g. "333" is associated with "DOMESTICATED ANIMAL."

5. Complementary Reel Symbol Set Database

Turning to FIG. 7, in accordance with the present invention, the data storage device or hard disk memory 318 of the gaming device 104 and/or the controller 102 may operate to store a complementary reel symbol set database 336. Generally, the gaming device 104 and/or the controller 102 may utilize the complementary reel symbol set database 336 to store information pertaining to reel symbols or icons that may be thematically associated with the initial completed image selected by the gaming device player, in accordance with the game described herein.

The complementary reel symbol set database 336 may comprise a plurality of records or entries. The database itself may be stored in tabular form or any other form that is practicable (e.g. object-based). The database defines fields for each of the entries, including (i) a symbol set identifier field 508, (ii) a symbol set name field 702, and (iii) reel symbol fields 1-N 704.

For each record or entry in the complementary reel symbol set database 336, a symbol set identifier field 508 may store data that uniquely identifies a set of reel symbols of the corresponding entry.

For each symbol set identifier 508 stored in a record of the complementary reel symbol set database 336, a symbol set name field 702 stores data describing the symbol set of the corresponding record. For example, the information stored in this field may comprise a textual description of the corresponding reel symbol set, e.g., the name "DOGS" corresponds to the identifier "PETS03."

For each symbol set identifier 508 stored in a record of the complementary reel symbol set database 336, reel symbol fields 1-N 704 store information associated with various icons or symbols that may be used in a reel-base game. The information stored in these fields may include graphic files (or pointers to graphic files), such as JPEG files, BMP files, and/or GIF files for use by the gaming device processor 300 in populating one or more reel(s). The aspect of populating a gaming device reel with appropriate symbols or icons is discussed in detail below.

E. Methods

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the present invention's methods. The system described above is an example of a system that would be useful in practicing the invention's methods.

Figure 8:
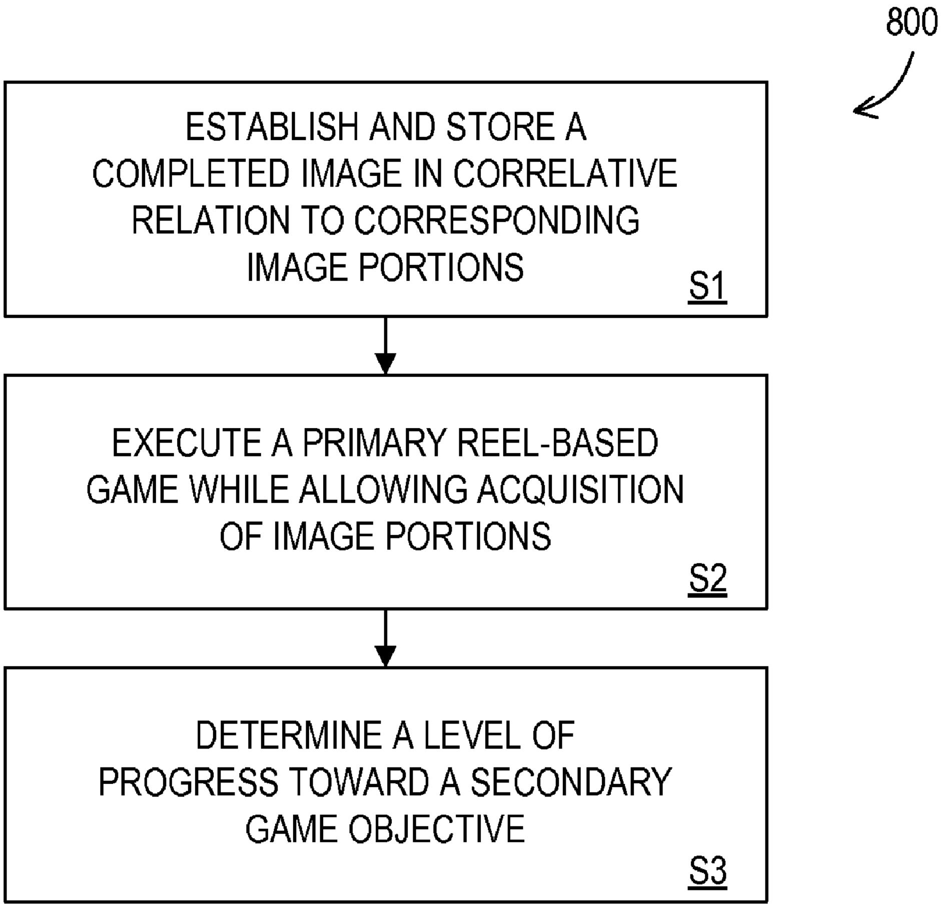
FIG. 8 is a flow chart illustrating an example process according to some embodiments of the present invention.

Referring to FIG. 8, a flow chart 800 is depicted that represents some embodiments of the present invention that may be performed by a controller 102, a gaming device 104, a peripheral device 210, a peripheral device server 216, and/or a casino. It must be understood that the particular arrangement of elements in the flow chart 800 of FIG. 8, as well as the number and order of example steps of various methods discussed herein, is not meant to imply a fixed order, sequence, quantity, and/or timing to the steps; embodiments of the present invention can be practiced in any order, sequence, and/or timing that is practicable. Likewise, the labels used to reference the individual steps of the methods are not meant to imply a fixed order, sequence, quantity, and/or timing to the steps.

In general terms and still referring to FIG. 8, method steps of some embodiments of the present invention may be summarized as follows: in Step S1, establish and store a completed image in correlation with a plurality of corresponding image portions, in Step S2, execute a primary reel-based slot machine game, the primary reel-based slot machine game incorporating a secondary game objective of acquiring the image portions to complete the set of image portions, and in Step S3, determining a level of progress toward the secondary game objective. Each of these steps may involve a number of sub-steps as will be detailed below. In particular, Step S2 may include: determining the occurrence of an image portion within the context of a reel-based slot machine game, populating a secondary game area with image portion content based on the occurrence of the image portion in the context of the reel-based game, and detecting an occurrence of a termination event associated with the reel-based game, and based on the occurrence of a termination event.

Step S1. Establish and Store a Completed Image in Correlative Relation to One or More Corresponding Image Portions Step S1 may include several sub-steps including receiving and storing a complete image; establishing an appropriate number of image portion(s) to be associated with the completed image; establishing and storing image characterization information based on completed image content; and establishing and storing complementary symbol set identifier(s) based on completed image content. These sub-steps are now discussed in more detail.

a. Receive and Store Complete Image

In accordance with the present invention, one or more completed images are received by the gaming device and/or controller and are stored in the image content database (described above). The image(s) may be received by the game device and/or the controller and thereafter stored in memory. For example, the image(s) may be loaded into memory of the game device by a game device manufacturer and/or loaded into memory by casino personnel as part of a gaming device maintenance or content update routine and/or remotely (e.g. via the Internet).

According to another embodiment, a player may use a peripheral device (described above) in order to upload image content onto the gaming device. For example, the player may utilize a cell phone or Personal Digital Assistant (PDA) to upload personalized image content.

b. Establish an Appropriate Number of Image Portion(s) to be Associated with the Completed Image Following receipt and storage of the completed image, an appropriate number of image portions to be associated with the completed image is determined. According to one embodiment, a manufacturer and/or owner operator of the gaming device may dictate the appropriate number of image portions. According to another embodiment, a player may request that a completed image be apportioned into a specific number of image portions as part of the game described herein.

For example, where a secondary game objective comprises attempting to assemble a completed image from a plurality of image portions, the image portions occurring within the context of a primary game, the player may specify the number of image portions to be included in the primary game. Preferably, in such an embodiment, the probability of occurrence of an image portion within the context of a primary game is proportional to the number of image portions dictated by the player.

Alternatively, the payouts or benefits provided for assembling the completed image may differ between any two players. For example, a first player may instruct a gaming device to apportion a complete image into four image portions and a second player may direct a gaming device to apportion a complete image into 100 image portions. In either case, throughout the course of playing the primary game, the probability of assembling a given percentage of the completed image should be the same for either player. The second player should receive more frequent image portions, each representing a smaller percentage of the completed image, while the first player should receive less frequent image portions representing larger percentages of the completed image. In either case, the likelihood of success in the secondary game should be equal for both players.

The manner by which a completed image may be dissected into an appropriate number of image portions may be conducted in accordance with an appropriate algorithm. Alternatively or in addition, the gaming device and/or the controller may utilize a grid function to establish coordinates or positions within the image and at which image portion boundaries may be established (e.g. if 25 image portions are specified/requested, the gaming device may utilize a 5×5 grid to establish 25 image portions).

c. Establish and Store Image Characterization Information Based on Completed Image Content Based on the content of a completed image, a gaming device manufacturer and/or owner/operator may establish one or more image characteristics for the completed image. For example, a completed image depicting a household pet, such as a cat, may be associated with image categories (i.e. characteristics) including e.g. "domestic animals" and "cats". Each of such categories may be represented by an image characteristic code stored in the image characteristic database (described above).

In accordance with one embodiment of the present invention, a gaming device player may be presented with a plurality of images from which he may choose an individual image for use in the game described herein. Based on the characteristics of the selected image, a player may be presented with additional images having the same characteristics associated therewith in any subsequent game(s).

d. Establish and Store Complementary Symbol Set Identifier(s) Based on Completed Image Content In accordance with some embodiments of the present invention, the completed images presented to a gaming device player are each associated with a set of complementary reel symbols. The complementary reel symbols may be stored in the complementary reel symbol set database. The reel symbols may be used in the context of a primary game and may be thematically related to the content of a selected image. For example, an image depicting a political or national landmark may be associated with reel symbols of a patriotic theme.

Step S2. Execute a primary reel-based slot machine game

Figure 9A:
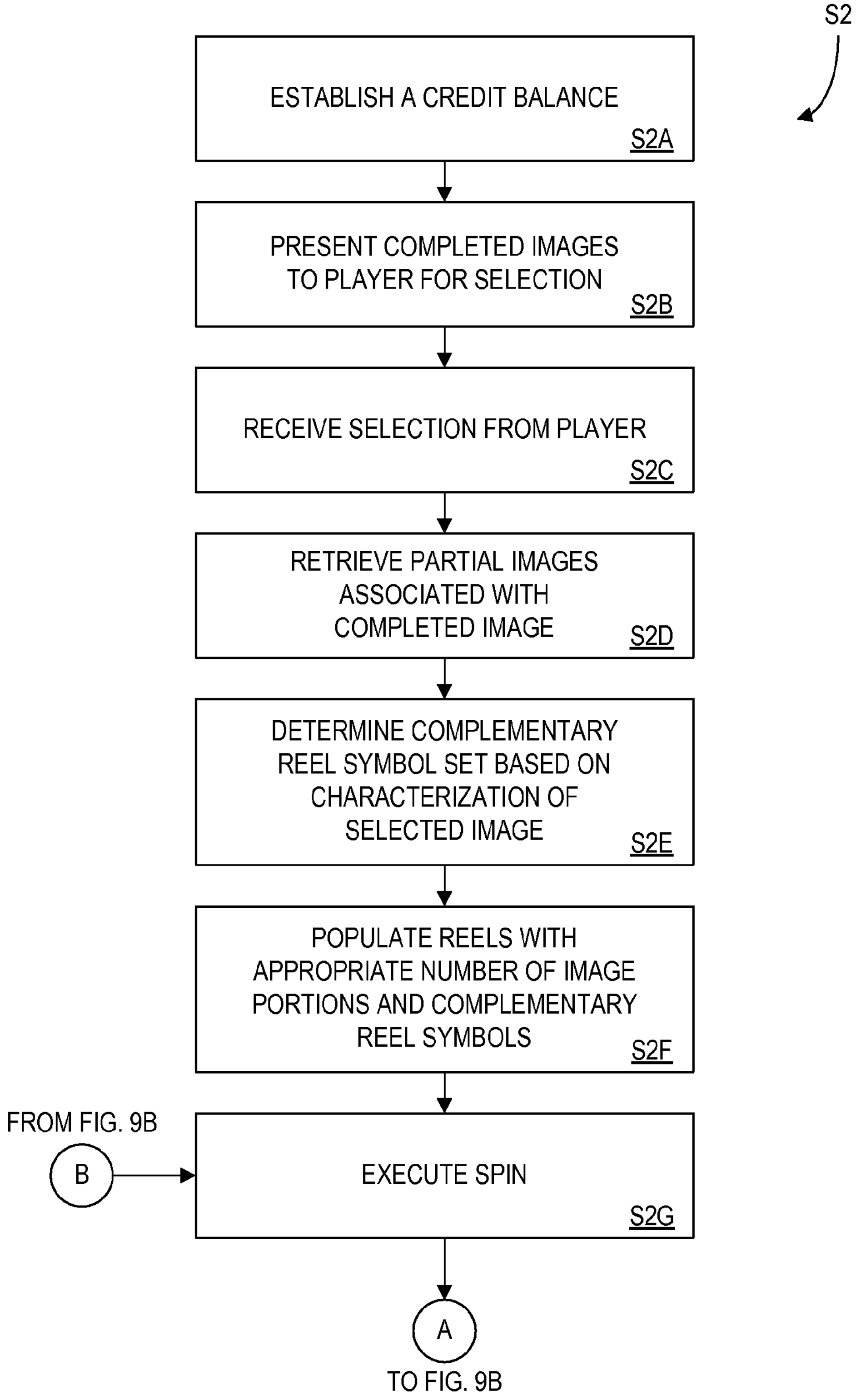
FIGS. 9A and 9B are a flow chart illustrating an example sub-process according to some embodiments of the present invention.
Figure 9B:
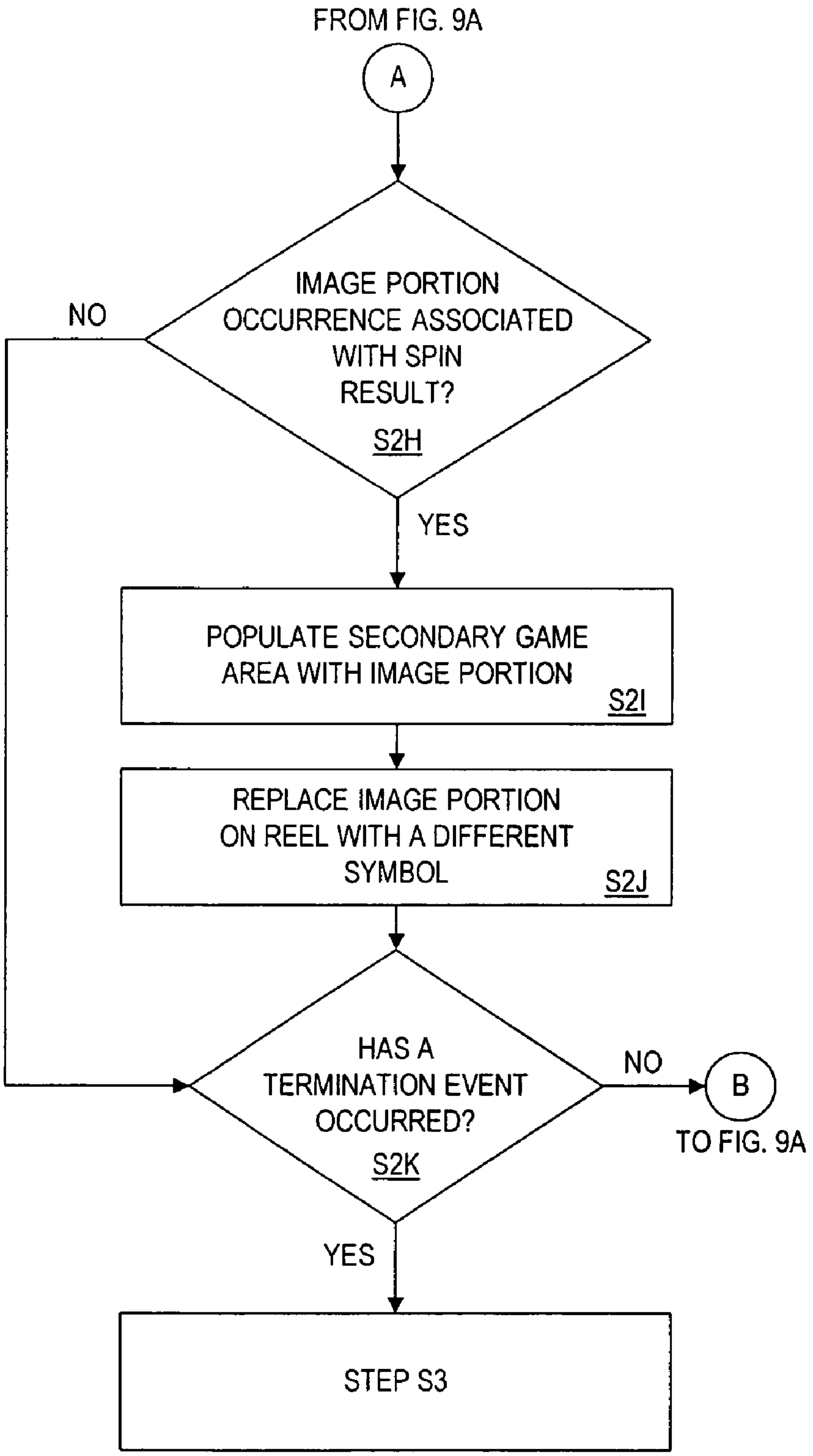

Turning now to FIGS. 9A and 9B, a flowchart depicting sub-steps of Step S2 is provided. In accordance with some embodiments of the present invention, Step S2 may include several optional sub-steps including establishing a credit balance; presenting one or more completed images to the player for selection; receiving signal indicating selection of completed image; retrieving partial images associated with completed image; determining complementary reel symbol set based on characterization of selected image; populating slot machine reels with (i) appropriate number of image portions and (ii) complementary reel symbols; executing spin/handle pull to produce a spin result; determining if an image portion occurrence is associated with the spin result; populating a secondary game area with appropriate image portion content if an image portion has occurred; prevent duplication of the image portion in the primary game in response to occurrence of image portion; and determining if a termination event has occurred. These sub-steps are now discussed in more detail.

a. Establish a Credit Balance (Flat Rate, etc.)

The game of the present invention comprises a primary game such as a reel-based slot machine game in conjunction with a secondary game. The secondary game may include an objective that may be achieved based on one or more result(s) occurring in the primary game.

In accordance with the present invention, a player may provide consideration to gain access to the primary game. The wager provided by the player may be established as a flat rate provided for a plurality of handle pulls or spins to be executed by the player. The player may be required to exhaust the flat rate wager, to execute a given number of handle pulls, or play for a predetermined duration of time prior to the gaming device and/or controller determining a result of the secondary game.

b. Present One or More Completed Images to the Player for Selection

Prior to executing a handle pull or spin in the primary game, the player may be presented with one or more completed images, which may be displayed to the player at a secondary game area of the gaming device. The images presented to the player may represent a subset of all available images (e.g. the gaming device may store hundreds of images but present only ten for selection by the player).

c. Receive Signal Indicating Selection of Completed Image

By utilizing a gaming machine input device, the player may register a signal indicating selection of one of the at least one previously displayed images. For example, the secondary game area may comprise or include a touch-screen that may be used by the player for selecting an image.

d. Retrieve Partial Images Associated with Completed Image

Following selection of a completed image, the gaming device and/or the controller may retrieve the appropriate image portions from the appropriate record of the image content database.

e. Determine Complementary Reel Symbol Set Based on Characterization of Selected Image Based on the characteristics of the selected image and any associated reel symbol sets indicated in the corresponding record of the image content database, the gaming device and/or the controller retrieves the appropriate reel symbols from the complementary reel symbol set database. For example, as discussed above, the retrieved reel symbols may be thematically related to the image having been selected by the player.

f. Populate Slot Machine Reels with (i) Appropriate Number of Image Portions and (ii) Complementary Reel Symbols The gaming device and/or controller may utilize the various image portions and complementary reel symbols to populate discreet positions of the primary game reels with (i) the image portions or an indication of an image portion (e.g. an icon representing an image portion) and (ii) the complementary reel symbols.

In accordance with one embodiment, the completed image displayed to the player on the secondary game area is animated in such a way as to show the completed image transform into its corresponding image portions prior to occupying a discreet reel position in the primary game area. Such animation may include the completed image appearing to break apart and succumb to gravity prior to various image portions (or image portion icons) occupying discreet reel positions. In addition, once the image portions and complementary symbols have been "placed" on the reels, the complete image previously shown may lose one or more of its' visual properties (e.g. hue, contrast, color, etc.).

For example, a player may select a complete image from a plurality of available images. The selected image may then enlarge and occupy a substantial portion of the secondary game area. Thereafter, the completed image may become animated, so as to appear to break apart into several image portions (e.g. puzzle pieces), which then appear to fall to a primary game area (i.e. representations of reels) located on a lower portion of the gaming device. Generally, the manner in which the image portions are assigned or allotted to their respective positions on the reel area of the gaming device may be conducted in an animated or otherwise appealing way.

g. Execute Spin/Handle Pull to Produce a Spin Result

In exchange for a portion of the player's consideration (e.g. a portion of a pre-paid flat rate or a per spin amount), the player may utilize a gaming device input device to initiate a spin/handle pull in the primary game. The spin/handle pull may be executed in a manner employing the generation of a random number in order to determine a primary game result (i.e. a spin result) associated with the spin/handle pull. Various manners for generating a random result in gaming devices such as slot machines are known to those in the art and thus need not be described in detail herein.

h. Determine if an Image Portion Occurrence is Associated with the Spin Result

Based on the spin result, the gaming device and/or the controller may determine whether or not the spin resulted in an image portion occurrence in the primary game. As noted above, an image portion may "occur" for example by occupying an area on a payline of the gaming device at the conclusion of the spin/handle pull. If the spin/handle pull yielded no image portion occurrence(s), the process proceeds to step sub-step k, described herein below.

i. If an Image Portion has Occurred, Populate Secondary Game Area with Appropriate Image Portion Content If the spin/handle pull result did yield the occurrence of an image portion (e.g. by including an image portion icon on the payline), the gaming device and/or controller determines a portion of the completed image to restore (e.g. by restoring the original color, hue, contrast, etc.). The gaming device then indicates the restoration to the player via the secondary game area. For example, where the image portion is designed to resemble a puzzle piece, an area of the secondary game area in the shape of a puzzle piece may be restored to resemble the corresponding portion of the original image (i.e. the image initially selected by the player).

The gaming device and/or controller may retrieve an appropriate image portion from the image content database, based on the originally selected complete image. In accordance with other embodiments, a skill element may be introduced whereby the player may be directed to accurately place the image portion in its respective area of the secondary game area.

j. In Response to Occurrence of Image Portion, Prevent Duplication of the Image Portion in the Primary Game In accordance with certain aspects of the present invention, the occurrence of a specific image portion within the context of the primary or secondary game is prevented from occurring again. That is, a player attempting to assemble a complete image from a plurality of image portions may not be subjected to acquiring duplicative image portions within the context of the primary game. Thus, each time a player acquires a given image portion, the player is assured that the image portion is unique and in fact helpful in progressing the player toward forming the completed image.

According to one embodiment of the invention, upon the occurrence of an image portion within the context of a primary game, a reel position associated with the image portion or an icon indicating the specific image portion is removed from the reel (or representation of the reel). Thus, a previously established number of discreet stops associated with the particular reel(s) may be reduced.

According to another embodiment of the invention, the probability of occurrence associated with the reel position or icon representing the image portion is reduced (e.g. reduced to 0). Thus, the likelihood that a player will be subject to the same image portion occurring within the context of a primary game is reduced or eliminated.

In accordance with yet another embodiment of the present invention, the image portion having occurred within the context of the primary game may be disassociated with the primary game and instead be substituted with e.g. another image portion or image portion icon and/or a substitute complementary reel symbol.

In accordance with yet another embodiment of the invention, the occurrence of an image portion may be allowed to happen in the context of a primary game, yet fail to benefit the player in the secondary game. For example, the particular image portion(s) may be deemed "active" for use in the primary game and "inactive" for use in the secondary game.

k. Determine if a Termination Event has Occurred

According to some embodiments of the invention, a primary game (or series of primary games) may conclude upon the occurrence of a termination event. Following the occurrence of a termination event, the gaming device and/or controller may perform a process to evaluate an amount of progress made toward achieving a secondary game objective (e.g. assembling a completed image).

Exemplary termination events may include, e.g., the occurrence of a predetermined number of spins or handle pulls occurring in the primary game and/or an elapsed duration of time, during which a player may attempt to progress toward a secondary game objective. In some embodiments a termination event may include receiving a particular symbol or outcome, such as "CHERRY-CHERRY-CHERRY" or a "jack high straight." In accordance with some embodiments of the invention, a termination event may comprise completing the stated objective of the secondary game.

If no termination event is determined to have occurred, the process returns to sub-step g, described herein above. However, if a termination event has occurred, the process flow proceeds to Step S3, secondary game result determination. In other words, following the occurrence of a termination event, the gaming device and/or the controller operates to evaluate a player's level of progress toward a secondary game objective via the process described below.

Step S3. Determine a Level of Progress Toward a Secondary Game Objective Based on at Least One Outcome Achieved in the Primary Game Step S3 may include several sub-steps including determining a level of completion associated with a secondary game based on at least one result in a primary, reel-based game; determining an award based on the level of completion; informing the player of the level of completion and the award; and providing the player with the award based on the level of completion. These sub-steps are now discussed in more detail.

a. Determine a Level of Completion Associated with a Secondary Game Based on at Least One Result in a Primary, Reel-based Game Based on the occurrence of one or more image portions in the context of a primary game, the gaming device and/or controller may make a determination with regard to a player's overall level of progress toward a secondary game objective.

As described above, the secondary game objective may compel a player to assemble a completed image from a plurality of image portions occurring within the context of a primary slot machine game. The determination of a level of completion associated with the secondary game may comprise determining a number of image portions acquired by the player (e.g. X of Y portions acquired) and/or a percentage of completion (e.g. 75% complete).

b. Determine an Award Based on the Level of Completion

Based on the determined level of completion, the gaming device and/or the controller may utilize a payout table to determine an award to be entitled to the player.

c. Inform the Player of the Level of Completion and the Award

Following determination of the award, an indication of the award is provided to the player. For example, the gaming device and/or the controller may utilize a gaming device output means to inform the player of the award. Preferably, the award to be provided to the player comprises an amount of currency or credit. In accordance with other embodiments, the award may comprise merchandise and/or services, or additional credit or time for use at the gaming device.

d. Provide the Player with the Award Based on the Level of Completion

Based on the determined award, the gaming device and/or the controller may operate to provide the award to the player. For example, the gaming device may dispense cash or tokens into a tray via a hopper mechanism. Alternatively or in addition, the gaming device and/or the controller may provide (e.g. print) a receipt or voucher that may be redeemed by the player for the award.

F. Example Illustrative Embodiments of the Invention

The following very specific additional examples are provided to illustrate particular embodiments of the present invention, particularly from the perspective of potential users of the invention, including players and casinos.

Example 1

A casino patron approaches a gaming device located on the floor of a local casino. The gaming device is designed to comprise a lower game area and an upper game area. The lower game area consists of a set of reels (or a representation of a set of reels), which prior to play appear to be blank (i.e. having no discreet symbols thereon).

The gaming device advertises its game as follows: "Insert $10 and receive 50 spins. Collecting pieces of the puzzle as you play, attempt to create the entire image initially shown on the upper screen. Win payouts based on how much of the puzzle you complete."

The player decides to play. She inserts ten dollars and is now entitled to fifty handle pulls (i.e. spins), which is indicated to her via a spin meter/counter on the front of the machine.

On the upper game play area, six inch by four inch color images appear along with instructions advising the player to select a single image by touching the image on the screen. The images range from landscapes to various country flags to famous movie scenes and celebrity photos. The six images initially shown have been selected from a much larger set of available images stored at the gaming device and/or controller (e.g. the images may have been selected randomly or because they share a common theme).

By touching the upper game screen, the player selects an image depicting the United States flag. The five images that were not selected by the player reduce in size and fade out of view. The selected image expands to fill the majority of the upper game area.

Figure 10A:
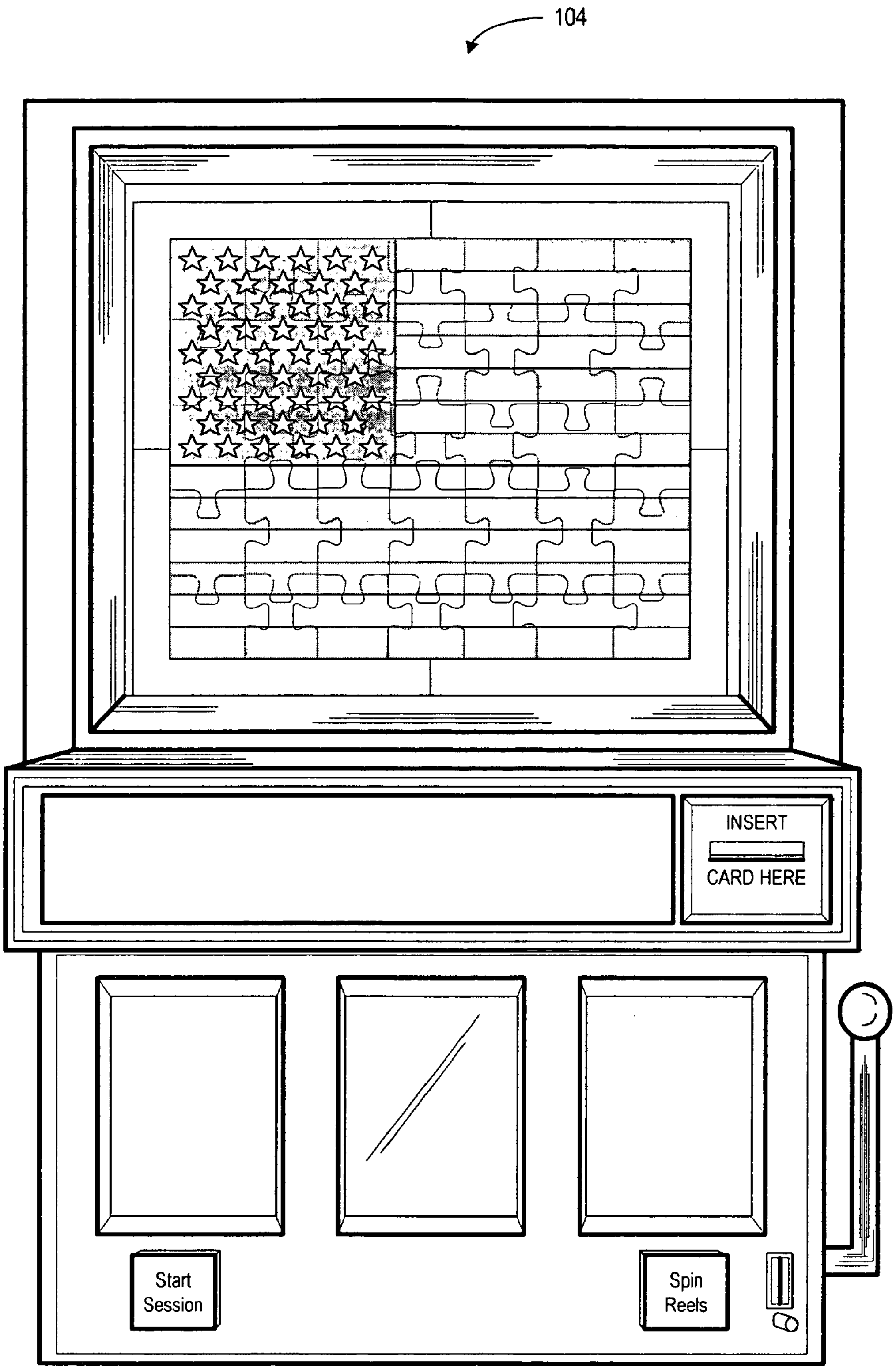
FIGS. 10A through 10D are illustrations demonstrating example displays of a gaming device at four different points in time while executing an example process according to some embodiments of the present invention.

After two or three seconds on screen, the enlarged image of the flag appears to break apart into approximately thirty-five image portions, each shaped like a jigsaw puzzle piece. FIG. 10A illustrates an example of what the gaming device 104 may look like at this stage of play. Next, the image portions appear to succumb to gravity, falling into the lower game area. Each image portion now occupies a discreet position on one of the reels of the lower game area. More specifically, the image portions are now interspersed throughout the reel stops of the reels located in the lower game area. The reels may contain only discreet image portions, or the image portions may be distributed amongst additional traditional or thematic game symbols.

Figure 10B:
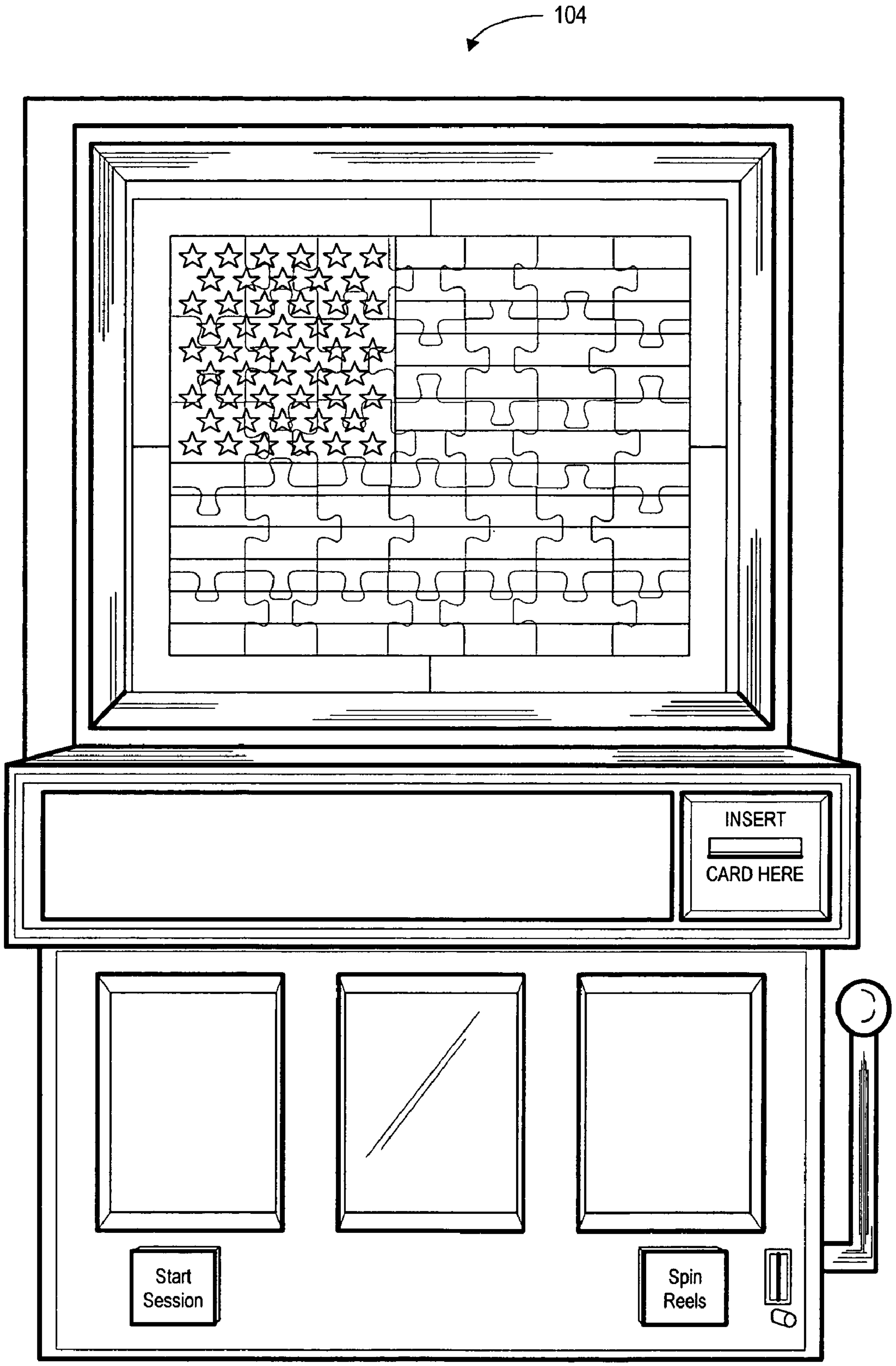

At this point with the reels populated with the images portions, the upper display area now only displays a place holder outline of the flag image puzzle pieces as illustrated in FIG. 10B. In some embodiments, the completed image (i.e. the image of the United States flag) may remain in the upper game area, but now appearing to have lost some of the characteristics previously associated with the image (e.g. contrast, hue, brightness, color, etc.).

Figure 10C:
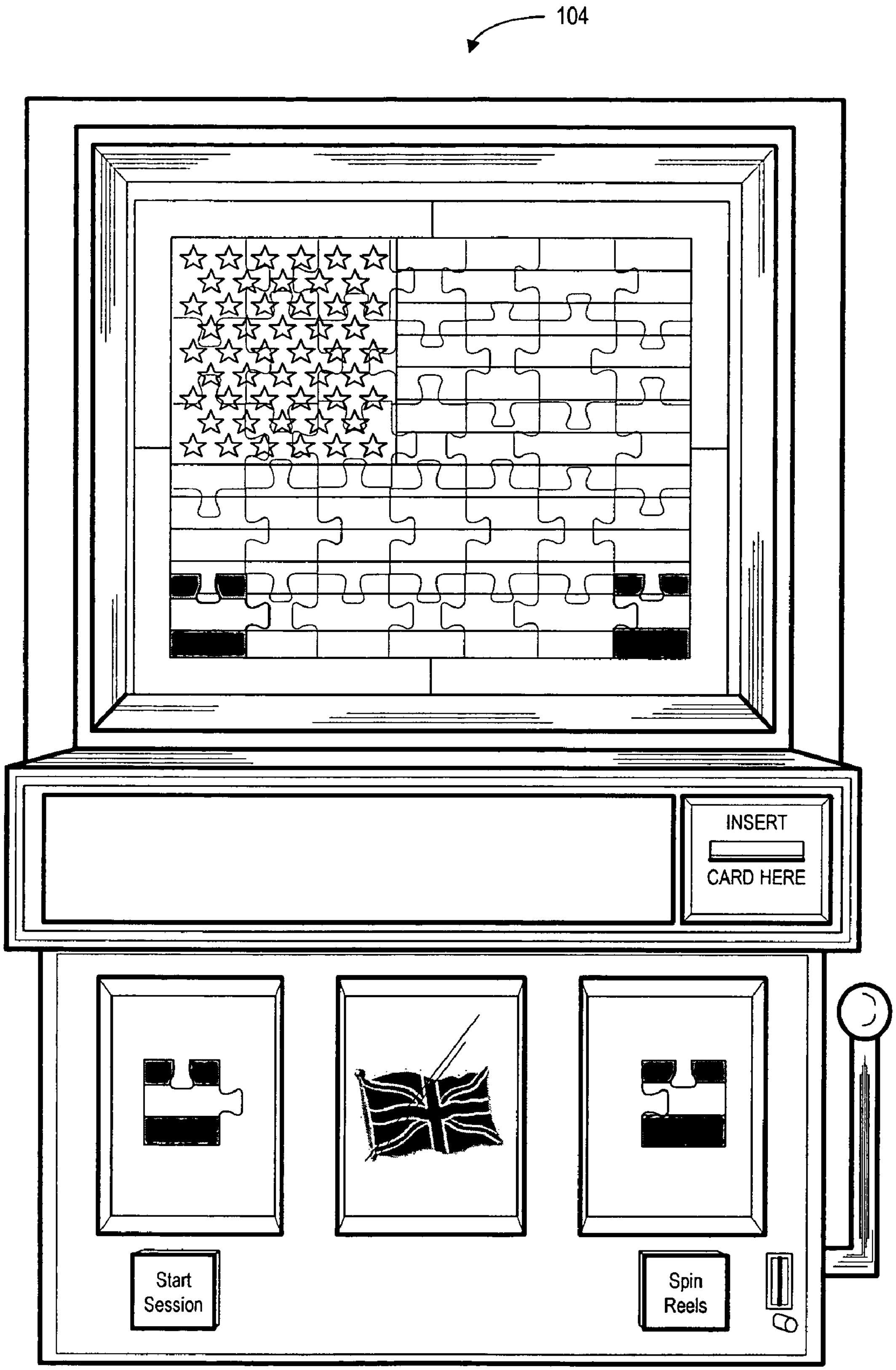

In exchange for consideration of one spin, the player pulls a handle on the side of the machine and the reels begin to rotate. A few moments later, the reels come to a stop displaying (i) an image portion in the form of a puzzle piece icon on the leftmost reel, (ii) a thematic game icon (e.g. a British flag) on the device's center reel and (iii) an image portion in the form of a puzzle piece icon on the device's rightmost reel. The two image portions (i.e. puzzle piece icons) having been displayed are then highlighted and returned to their respective positions in the upper game area. FIG. 10C illustrates the gaming device 104 at this stage of play.

Each of the positions on the reels having previously been occupied by the image portions that now occupy the upper game area are then, in some embodiments, updated to include alternative symbols (e.g. a thematic game icon). According to other embodiments, the probability associated with those reel positions is adjusted downward to prevent the duplicative occurrence of those reel positions/image portions in subsequent spins (e.g. the probability of occurrence may be adjusted to 0). According to yet other embodiments, the number of discreet positions or "stops" on the reel is reduced, in order to eliminate the possibility of an occurrence of the same image portions reappearing on the device's payline. In accordance with other embodiments, the image portions now being utilized in the upper game area are replaced on the reels with substitute image portions (e.g. image portions that were previously unavailable to the player).

The player and the gaming device repeat the process until all 50 spins have been exhausted. Throughout play, in addition to acquiring image portions, the player is awarded cash or game credit (i.e. a spin payout) for achieving success in the primary game (e.g. the player may win cash for three matching game icons appearing on the device's lower game area payline on a given spin).

Figure 10D:
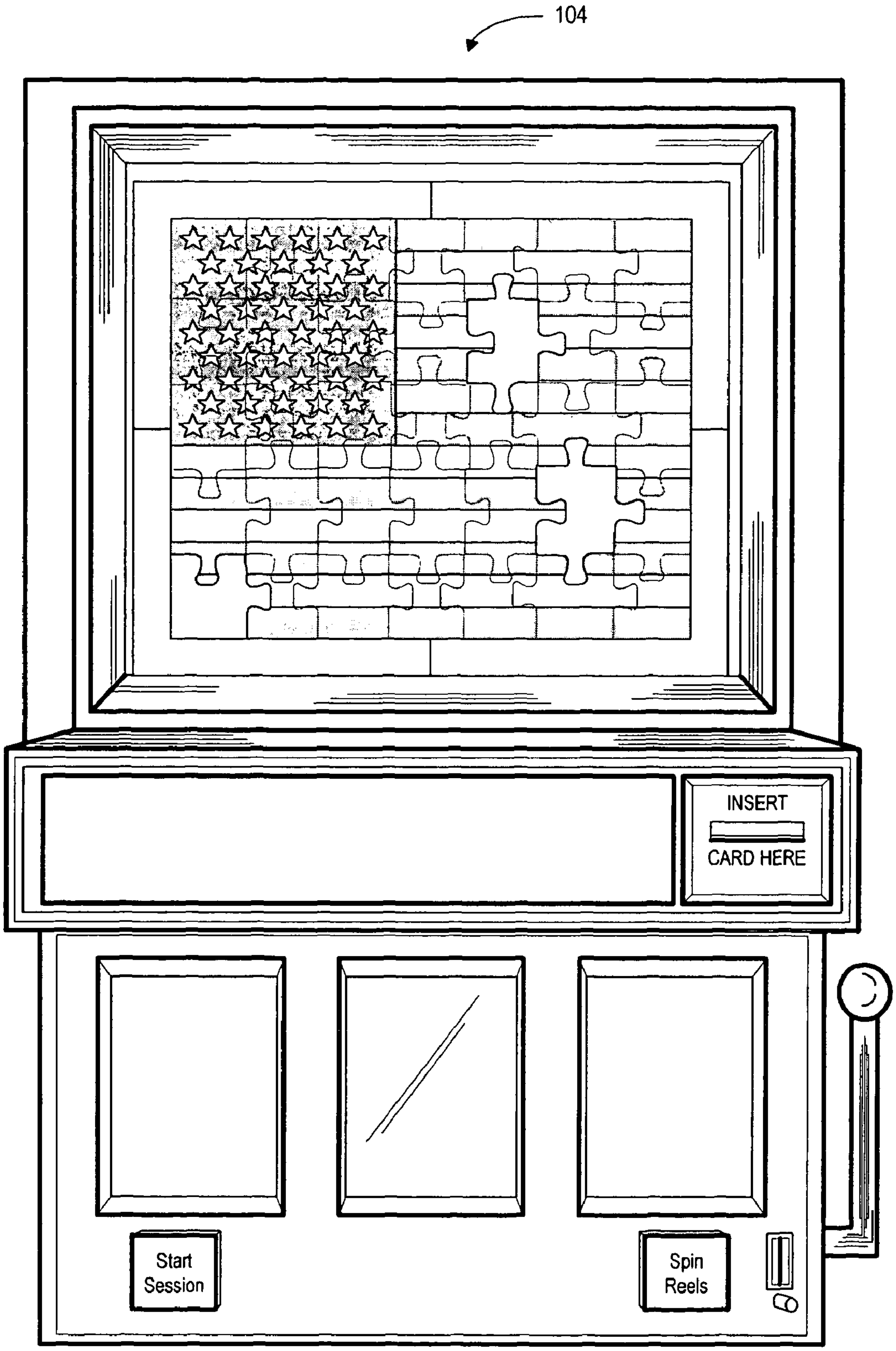

According to the various embodiments herein, once all fifty credits are exhausted a termination event is deemed to have occurred. FIG. 10D illustrates an example of what the gaming device 104 may look like after all fifty credit have been exhausted. The gaming device 104 then makes a determination as to a level of progress toward the overall game objective (i.e. the completion of the initial United States flag image). Based on the determined level of completion, an award such as funds and/or game credit is due the player. The level of completion is indicated to the player for example as a percentage (e.g. 91% complete) or ratio (e.g. 32 of 35 pieces) via the second game area. Thereafter, a game payout (i.e. the award) is provided to the player. For example, the game payout may be dispensed as cash by the device to the player and/or the device may provide (e.g. print) a voucher redeemable for the game payout or other award.

Example 2

A casino patron approaches a gaming device located on the floor of a local casino. The gaming device is designed to comprise a lower game area and an upper game area. The lower game area consists of a set of three reels (or a representation of a set of reels). Each reel contains a plurality of thematic game symbols. In addition, throughout each reel is distributed a plurality of game symbols for use in a secondary game. The secondary game symbols individually represent one of the fifty United States. Each of the state symbols is depicted in both red and blue throughout the reels.

The gaming device advertises its game as follows: "Insert $25 and play until the election winner is determined. Choose to play as the "blue party" election candidate or as the "red party" election candidate. Collecting states as you play, attempt to collect 270 electoral votes to secure office. Win a payout based on whether you win the election and your margin of victory over your opponent."

In this case, each state symbol is associated with a predetermined party (red or blue) and a predetermined number of electoral votes.

The player decides to play. He inserts $25 and is thereafter entitled to play the game. The player registers an input with the gaming device indicating his desire to represent the blue party (e.g. via a touch screen or dedicated button).

On the upper game play area, a representation of a map appears. At the outset of the game (i.e. prior to the player spinning the reels), the map indicates that no states are currently associated with either party and that no electoral votes have been awarded for any state.

The player begins the game by actuating a lever located on the right side of the gaming device. Actuating the lever initiates the reels to spin temporarily and subsequently come to rest at a randomly determined position. When the reels come to rest, three symbols are positioned across the middle area or "payline" of the game device. The symbols include a blue representation of the state of Nebraska on the device's leftmost reel, a thematic game icon on the device's center reel, and a red representation of Hawaii on the device's rightmost reel.

The portion of the map in the secondary game area representing Nebraska is illuminated to indicate that the blue party has "won" that state and the associated electoral votes. In addition, the portion of the secondary game area map representing Hawaii is illuminated to indicate that the red party has "won" the state and the associated electoral votes. An electoral vote meter or counter associated with each party is updated to reflect the acquisition of electoral votes from each state (5 votes for Nebraska, 4 votes for Hawaii).

For each reel position containing a representation of a state (either red or blue), the device adjusts the probability of occurrence for those positions downward such that the likelihood of those positions recurring on the device's payline is reduced or eliminated entirely. Alternatively, the probabilities associated with each position may not be adjusted at all, thereby allowing competing parties to "steal" electoral votes from one another.

The player repeats the game initiation procedure until one candidate has secured at least 270 electoral votes, after which a determination is made as to the number of electoral votes secured by each candidate and the winning candidate's margin of victory.

The player is informed that the blue party has secured 275 electoral votes based on the various states secured throughout the course of play. Based on the number of votes secured, the gaming device determines an appropriate award or payout to be conferred to the player. For example, the device may make the determination based on information stored in a pay table accessible by the gaming device.

Example 3

A casino patron approaches a gaming device located on the floor of a local casino. The gaming device is designed to comprise a lower game area and an upper game area. The lower game area includes a set of three reels (or a representation of a set of reels). The reels of the lower game area appear blank (i.e. the reels have no discreet symbols thereon).

The gaming device advertises its game as follows: "Establish a credit balance and specify the number of spins you would like to receive for that balance. Collecting pieces of the puzzle as you play, attempt to create the entire image initially shown on the upper screen. Win a payout based on how much of the puzzle you complete."

The player decides to play. She inserts $50 and specifies that she would like to receive 50 game credits (e.g. via gaming device input means). The initial credit balance (i.e. 50 credits) is then indicated to her via a credit meter on the front of the machine.

On the upper game play area, ten 4"×4" color images appear along with instructions advising the player to select a single image by touching the image on its designated area of the screen. The images initially shown have been selected from a much larger set of available images stored e.g. at the gaming device and/or controller (e.g. the images may have been selected randomly or because they share a common theme).

By touching the upper game screen, the player selects an image depicting a wildlife scene. The images that were not selected by the player reduce in size and fade out of view. The selected image then expands to fill the majority of the upper game area.

The player is then instructed to specify (or select) a number of image portions. The number specified (or selected) by the player represents the total number of image portions that the initial image will be reduced to.

The player specifies that the image should be apportioned into 25 pieces. The gaming device then indicates 25 individual image portions, the entirety of which forms the completed initial wildlife scene image.

After 2-3 seconds on screen, the wildlife image appears to break apart into exactly 25 image portions. The image portions appear to succumb to gravity, falling into the lower game area along with various thematic game-related symbols. Each image portion now occupies a discreet position on one of the reels of the lower game area. The completed image remains in the upper game area, but now appears to have lost some of the characteristics previously associated with the image (e.g. contrast, hue, brightness, color, etc.).

Utilizing the game described above with respect to example no. 1, the player and the gaming device conduct the game until all 50 credits have been exhausted. Throughout play, in addition to acquiring image portion icons, the player is awarded cash or game credit for achieving success in the traditional reel-based game, as noted in the above examples.

In accordance with the embodiment of the invention described here, the payouts or awards received for achieving success in the primary game are based on (i) the total initial balance established with the gaming device and (ii) the initial number of credits requested by the player. In addition, the probability of occurrence of an image portion icon appearing on the machine's payline area is determined in response to the total number of image portions requested or selected by the player.

For example, by specifying or selecting a large number of image portions to be allocated across the reeled area of the gaming device, the icons associated with those image portions may occur more frequently on the gaming device payline. Conversely, by specifying or selecting a small number of image portions to be allocated across the reeled area of the gaming device, the icons associated with those image portions may occur less frequently on the gaming device payline.

Once all 50 credits are exhausted, the gaming device makes a determination as to a level of progress toward the overall game objective (i.e. the completion of the initial Mount Rushmore image). Based on the determined level of completion, an award such as funds and/or game credit is due the player. The level of completion is indicated to the player (e.g. as a percentage (e.g. 80% complete) or ratio (e.g. 16 of 25 pieces) via the second game area. Thereafter, a game payout (i.e. the award) is provided to the player. For example, the game payout may be dispensed as cash by the device to the player and/or the device may provide (e.g. print) a voucher redeemable for the game payout or other award.

G. Additional Embodiments

In some embodiments, rather than attempting to assemble a completed image from a plurality of image portions, the player may attempt to assemble any other form of composition. For example, the player may attempt to assemble a complete musical composition from portions of the composition occurring in the context of a primary game. For example, the "image portions" described herein may be embodied as portions (e.g. bars) of a musical composition.

In some embodiments, certain image portions or image portion icons may act as "wild card" image portions and may thus be utilized to complete any portion of a given complete image. That is, specific image portions needn't be allocated for use throughout the primary game. Instead, a predefined primary game element (e.g. an icon depicting a generic puzzle piece shape) may entitle the player to progress in a secondary game.

In some embodiments, there are several manners in which various image portions may be displayed in the context of a primary game. For example, rather than interspersing image portions with traditional reel-based game elements, the image portions may overlay various underlying elements in the context of a primary game. Alternatively, the image portions may serve a dual purpose in that the image portions themselves may appear in the shapes of traditional reel-based game elements (e.g. cherries, lemons, etc.).

In some video poker embodiments, image portions may be interspersed with representations of playing cards. As the cards are "dealt" to the player, the player may be provided with one or more image portion for use in the secondary game described herein.

In some embodiments, a cashless gaming receipt or ticket may include indicia representing a current status of a secondary game, including the particular image portions a player may have acquired during an unfinished gaming session. In some embodiments, the indicia may be in the form of, for example, a grid that represents locations of image portions acquired and the player may use the cashless gaming receipt to re-initiate or continue his game on a different gaming device using a different image but with corresponding image portions in the same positions as he previously had, or in some embodiments, simply the same percentage of acquired image portions.

In some embodiments, the secondary game may be a group game. For example, a number of gaming devices operated by different players may contribute image portions (or other game pieces) to a shared secondary display (or to completing a group overall objective). In such embodiments, the entire group, for example, may receive a payout if the group manages to, for example, complete the image. In some embodiments, players may compete against each other and/or other groups to see who can complete an image first or make the most progress before a termination event, such as a player getting a particular outcome in the primary game, ends the competition.

In some embodiments, the symbols used on the reels of the primary game may only include image portions (or game pieces) from the secondary game. In other words, where the secondary game objective involves collecting fifty-two cards, the primary game may be video poker. In some embodiments, the game pieces of the secondary game may be identified by their relative position in an image, or by an index number, and the same pieces may be used on the reels of the primary game. For example, if a player gets "BELL 56-BAR 22-CHERRY 14" in the primary game, the "BAR" symbol may be used in the secondary game if pursuit of the secondary objective would be advanced by acquiring a "BAR" symbol at position number "22" on the secondary display area. In other words, in some embodiments, all pieces used in the primary game may be relevant to the secondary game and/or vice versa.

H. Conclusion

It should be noted that the embodiments described with reference to the following figures are presented for illustrative purposes only and are not meant to be limiting in any sense. It should also be noted that, as used herein, the terms "first embodiment", "second embodiment", "third embodiment", "an embodiment", "embodiment", "embodiments", "the embodiment", "the embodiments" "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Further, it should be noted that although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order.

It is clear from the foregoing discussion that the disclosed systems and methods to provide set completion type games represents an improvement in the art of gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method of operating a gaming device including a plurality of instructions, the method comprising:

(a) causing an input device to enable a player to make an input corresponding to a wager for a predetermined gaming session, the predetermined gaming session including a predetermined quantity of plays of a wagering game, said predetermined quantity being greater than one;

(b) causing a processor to execute the plurality of instructions to cause a selection of one of a plurality of complete images for said predetermined gaming session, the selected complete image being associated with the predetermined gaming session;

(c) causing the processor to execute the plurality of instructions to associate a designated number of image portions with the selected complete image, the designated number being at least one;

(d) for each of the plurality predetermined quantity of plays of the wagering game of the predetermined gaming session, causing the processor to execute the plurality of instructions to:

(i) generate an outcome for the play of the wagering game;

(ii) cause a display device to display the generated outcome;

(iii) if the displayed outcome is associated with at least one of the designated number of image portions, cause the display device to display a secondary game including the at least one image portion associated with the displayed outcome; and (iv) cause the display device to display any primary award associated with the displayed outcome;

(e) causing the processor to execute the plurality of instructions to detect an occurrence of a termination event associated with the predetermined gaming session, said termination event based on the predetermined quantity of plays of the wagering game and regardless of completion of the selected image;

(f) in response to the occurrence of the termination event, causing the processor to execute the plurality of instructions to determine a level of completion of the selected image of the secondary game based on each of the displayed image portions for the secondary game relative to the designated number of image portions associated with the selected complete image for said predetermined gaming session;

(g) causing the display device to display any secondary award to the player based on the determined level of completion of the selected image of the secondary game; and (h) causing the processor to execute the plurality of instructions to cause each displayed primary award and each displayed secondary award to be provided to the player, wherein each of the designated number of image portions associated with the selected complete image for said predetermined gaming session do not have to be displayed for the secondary award to be provided to the player.

2. The method of claim 1, wherein the predetermined gaming session is based on at least one of: (i) a predetermined number of plays of the wagering game, the predetermined number being based on the wager; and (ii) a predetermined amount of time for the wagering game, the predetermined amount of time being based on the wager and associated with the predetermined quantity of plays of the wagering game.

3. A method of operating a gaming device including a plurality of instructions, the method comprising:

(a) causing an input device to enable a player to make an input corresponding to a wager for a predetermined gaming session, the predetermined gaming session including a predetermined quantity of plays of a first game and a play of a second game, said predetermined quantity being greater than one;

(b) causing a display device to display a plurality of complete images to the player;

(c) causing the input device to enable the player to make an input corresponding to a selection of one of the plurality of complete images for the play of the second game, the selected complete image being associated with a designated number of image portions, the designated number being at least one;

(d) for each of the predetermined quantity of plays of the first game of the predetermined gaming session, causing the processor to execute the plurality of instructions to:

(i) generate one of a plurality of outcomes for said play of the first game;

(ii) cause the display device to display the generated outcome for said play of the first game;

(iii) if the displayed outcome is associated with at least one of the designated number of image portions of the selected complete image, accumulate said image portion for display in the play of the second game; and (iv) provide any first award based on the displayed outcome for said play of the first game;

(e) for the play of the second game of the predetermined gaming session, causing the display device to display any accumulated image portions of the selected complete image resulting from the displayed outcomes of the predetermined quantity of plays of the first game of the predetermined gaming session;

(f) after the predetermined quantity of plays of the first game of the predetermined gaming session, causing the processor to execute the plurality of instructions to determine any second award based on the accumulated image portions of the selected complete image displayed in the play of the second game relative to the designated number of image portions associated with the selected complete image; and (g) causing the processor to execute the plurality of instructions to provide the determined second award to the player, wherein each of the designated number of image portions associated with the selected complete image for said predetermined gaming session do not have to be displayed for the secondary award to be provided to the player.

4. The method of claim 3, which includes enabling the player to select the designated number of image portions associated with the selected complete image.

5. The method of claim 4, wherein the designated number of image portions collectively form the selected complete image.

6. The method of claim 3, which includes causing the display device to display a portion of the selected complete image based on the accumulated image portions resulting from the displayed outcomes of the plays of the first game of the predetermined gaming session, the displayed portion representing a level of progress toward a second game objective.

7. The method of claim 6, which includes causing the processor to execute the plurality of instructions to:

(i) determine one second award if the level of progress corresponds to the accumulation of all of the image portions of the selected complete image; and (ii) determine a different second award if the level of progress corresponds to the accumulation of less than all of the image portions of the selected complete image.

8. The method of claim 3, which includes causing the processor to execute the plurality of instructions to:

(i) determine the first award based on a first payout table associated with the first game; and (ii) determine the second award based on a second payout table associated with the second game.

9. A method of operating a gaming device including a plurality of instructions, the method comprising:

(a) causing an input device to enable a player to make an input corresponding to a wager for a predetermined gaming session, the predetermined gaming session including a predetermined quantity of plays of a wagering game, said predetermined quantity being greater than one;

(b) causing a processor to execute the plurality of instructions to cause a selection of one of a plurality of complete images for said predetermined gaming session;

(c) causing the processor to execute the plurality of instructions to determine a set of image portions to be associated with the selected complete image for said predetermined gaming session, the set of image portions including at least one image portion;

(d) for each of the predetermined quantity of plays of the wagering game of the predetermined gaming session, causing the processor to execute the plurality of instructions to:

(i) generate one of a plurality of outcomes for said play of the wagering game;

(ii) cause the display device to display the generated outcome for said play of the wagering game;

(iii) if the displayed outcome is associated with any of the image portions associated with the selected complete image, accumulate said image portions for said predetermined gaming session; and (iv) determine any first award to be provided to the player for said play of the wagering game, the determination based on the displayed outcome for said play of the wagering game;

(e) after the predetermined quantity of plays of the wagering game of the predetermined gaming session, causing the processor to execute the plurality of instructions to determine a level of progress toward an accumulation of all of the image portions of the set of image portions associated with the selected complete image for the predetermined gaming session;

(f) causing the processor to execute the plurality of instructions to:

(i) determine a second award to be provided to the player if the level of progress corresponds to the accumulation of all of the image portions of the set of image portions associated with the selected complete image for the predetermined gaming session; and (ii) determine a third award to be provided to the player if the level of progress corresponds to the accumulation of less than all of the image portions of the set of image portions associated with the selected complete image for the predetermined gaming session, the third award being different than the second award; and (g) providing any determined awards to the player.

10. The method of claim 9, which includes causing the processor to execute the plurality of instructions to determine the set of image portions associated with the selected complete image based on an input made by the player.

11. The method of claim 9, which includes:

(i) causing the input device to enable the player to make an input to select one of the complete images for said predetermined gaming session;

(ii) associating image characterization information with the selected complete image;

(iii) associating a complementary symbol set identifier with the selected complete image;

(iv) causing the processor to execute the plurality of instructions to determine a complementary symbol set for the wagering game based on the characterization information and the complementary symbol set identifier associated with the selected complete image; and (v) causing the display device to display a plurality of symbol generators to generate and display the outcome for each play of the wagering game, the symbol generators displaying: (1) a symbol representing each of the image portions associated with the selected complete image; and (2) a plurality of complementary symbols from the determined complementary symbol set.

12. The method of claim 11, which includes, for each of the predetermined quantity of plays of the wagering game of the predetermined gaming session, causing the processor to execute the plurality of instructions to prevent a same one of the image portions from being associated with the outcome for a subsequent play of the wagering game.

13. The method of claim 9, which includes:

(i) causing the processor to execute the plurality of instructions to determine the level of progress based on each of the displayed outcomes of the wagering game of the predetermined gaming session; and (ii) causing the display device to display information to the player relating to the level of progress and any awards provided to the player.

14. The method of claim 9, which includes causing the processor to execute the plurality of instructions to:

(i) determine the second award based on the level of progress being equal to one-hundred percent of the selected complete image; and (ii) determine the third award based on the level of progress being greater than zero percent and less than one-hundred percent of the selected complete image.

15. A gaming device comprising:

a display device;

an input device;

a processor; and a memory device which stores a plurality of instructions which when executed by the processor cause the processor to operate with the display device and the input device to:

(i) enable a player to make an input corresponding to a wager for a predetermined gaming session, the predetermined gaming session including a predetermined quantity of plays of a wagering game, said predetermined quantity being greater than one;

(ii) cause a selection of one of a plurality of complete images, the selected complete image being associated with the predetermined gaming session;

(iii) associate a designated number of image portions with the selected complete image, the designated number being at least one;

(iv) for each of the predetermined quantity of plays of the wagering game of the predetermined gaming session:

(a) generate an outcome for the play of the wagering game;

(b) display the generated outcome;

(c) if the displayed outcome is associated with at least one of the designated number of image portions, display a secondary game including the at least one image portion associated with the displayed outcome; and (d) display any primary award associated with the displayed outcome;

(v) detect an occurrence of a termination event associated with the predetermined gaming session, said termination event based on the predetermined quantity of plays of the wagering game and regardless of completion of the selected images;

(vi) in response to the occurrence of the termination event, determine a level of completion of the selected image of the secondary game, the level of completion based on the displayed image portions for the secondary game relative to the designated number of image portions associated with the selected complete image;

(vii) display any secondary award to the player based on the determined level of progress toward the objective of the secondary game; and (viii) cause each displayed primary award and each displayed secondary award to be provided to the player, wherein all of the image portions associated with the selected complete image for said predetermined gaming session do not need to be displayed for the secondary award to be provided to the player.

16. The gaming device of claim 15, wherein the predetermined gaming session is based on at least one of: (i) a predetermined number of plays of the wagering game, the predetermined number being based on the wager; and (ii) a predetermined amount of time for the wagering game, the predetermined amount of time being based on the wager and associated with the predetermined quantity of plays of the wagering game.

17. A gaming device comprising:

a display device;

an input device;

a processor; and a memory device which stores a plurality of instructions which when executed by the processor cause the processor to operate with the display device and the input device to:

(i) enable a player to make a wager input corresponding to a wager for a predetermined gaming session, the predetermined gaming session including a predetermined quantity of plays of a first game and a play of a secondary game, said predetermined quantity being greater than one;

(ii) display a plurality of complete images to the player;

(iii) enabling the player to make an input corresponding to a selection of one of the plurality of complete images for the player of the second game, the selected complete image being associated with a designated number of image portions, the designated number being at least one;

(iv) for each of the predetermined quantity of plays of the first game of the predetermined gaming session:

(a) generate one of a plurality of outcomes for said play of the first game;

(b) display the generated outcome for said play of the first game;

(c) if the displayed outcome is associated with at least one of the designated number of image portions of the selected complete image, accumulate said image portion for display in the play of the secondary game; and (d) provide any first award based on the displayed outcome for said play of the first game;

(v) for the play of the secondary game of the predetermined gaming session, display any accumulated image portions of the selected complete image resulting from the displayed outcomes of the predetermined quantity of plays of the first game of the predetermined gaming session;

(vi) after the predetermined quantity of plays of the first game of the predetermined gaming session, determine any second award based on the accumulated image portions of the selected complete image displayed in the play of the secondary game relative to the designated number of image portions associated with the selected complete image; and (vii) provide the determined second award to the player, wherein each of the designated number of image portions associated with the selected complete image for said predetermined gaming session do not have to be displayed for the second award to be provided to the player.

18. The gaming device of claim 17, wherein the designated number of image portions associated with the complete image is selected by the player.

19. The gaming device of claim 18, wherein the designated number of image portions collectively form the selected complete image.

20. The gaming device of claim 17, cause the processor to operate with the display device to display a portion of the selected complete image based on the accumulated image portions resulting from the displayed outcomes of the predetermined quantity of plays of the first game of the predetermined gaming session, the displayed portion representing a level of progress toward a second game objective.

21. The gaming device of claim 20, wherein when executed by the processor, the plurality of instructions cause the processor to:

(i) determine one second award if the level of progress corresponds to the accumulation of all of the image portions of the selected complete image; and (ii) determine a different second award if the level of progress corresponds to the accumulation of less than all of the image portions of the selected complete image.

22. The gaming device of claim 17, wherein when executed by the processor, the plurality of instructions cause the processor to:

(i) determine the first award based on a first payout table associated with the first game; and (ii) determine the second award based on a second payout table associated with the second game.

23. A gaming device comprising:

a display device;

an input device;

a processor; and a memory device which stores a plurality of instructions which when executed by the processor cause the processor to operate with the display device and the input device to:

(i) enable a player to make an input corresponding to a wager for a predetermined gaming session, the predetermined gaming session including a predetermined quantity of plays of a wagering game, said predetermined quantity being greater than one;

(ii) cause a selection of one of a plurality of complete images for said predetermined gaming session;

(iii) determine a set of image portions associated with the selected complete image for said predetermined gaming session, the set of image portions including at least one image portion;

(iv) for each of the predetermined quantity of plays of the wagering game of the predetermined gaming session:

(a) generate one of a plurality of outcomes for said play of the wagering game;

(b) cause the display device to display the generated outcome for said play of the wagering game;

(c) if the displayed outcome is associated with any of the image portions associated with the selected complete image, accumulate said image portions for said predetermined gaming session; and (d) determine any first award to be provided to the player for said play of the wagering game, the determination based on the displayed outcome for said play of the wagering game;

(v) after the predetermined quantity of plays of the wagering game of the predetermined gaming session, determine a level of progress toward an accumulation of all of the image portions of the set of image portions associated with the selected complete image;

(vi) determine a second award to be provided to the player if the level of progress corresponds to the accumulation of all of the image portions of the set of image portions associated with the selected complete image;

(vii) determine a third award to be provided to the player if the level of progress corresponds to the accumulation of less than all of the image portions of the set of image portions associated with the selected complete image, the third award being different than the second award; and (viii) provide any determined awards to the player.

24. The gaming device of claim 23, wherein when executed by the processor, the plurality of instructions cause the processor to determine the set of image portions associated with the selected complete image based on an input made by the player.

25. The gaming device of claim 23, wherein when executed by the processor, the plurality of instructions cause the processor to:

(i) enable the player to make an input to select one of the complete images for said predetermined gaming session;

(ii) associate image characterization information with the selected complete image;

(iii) associate a complementary symbol set identifier with the selected complete image;

(iv) determine a complementary reel symbol set for the wagering game based on the characterization information and the complementary symbol set identifier associated with the selected complete image; and (v) display a plurality of symbol generators to generate and display the outcome for each play of the wagering game, the symbol generators displaying: (1) a symbol representing each of the image portions associated with the selected complete image; and (2) a plurality of complementary symbols from the determined complementary symbol set.

26. The gaming device of claim 23, wherein when executed by the processor, the plurality of instructions cause the processor to:

(i) determine the level of progress based on each of the displayed outcomes of the wagering game of the predetermined gaming session; and (ii) display information to the player relating to the level of progress and any awards provided to the player.

27. The gaming device of claim 23, wherein when executed by the processor, the plurality of instructions cause the processor to:

(i) determine the second award based on the level of progress being equal to one-hundred percent of the selected complete image; and (ii) determine the third award based on the level of progress being greater than zero percent and less than one-hundred percent of the selected complete image.

* * * * *